(12) United States Patent
Chmelicek et al.

(10) Patent No.: US 11,095,175 B2
(45) Date of Patent: Aug. 17, 2021

(54) MOTOR

(71) Applicant: ROMAX TECHNOLOGY LIMITED, Cobham (GB)

(72) Inventors: Petr Chmelicek, Nottingham (GB); Ashish Goel, Nottingham (GB)

(73) Assignee: ROMAX TECHNOLOGY LIMITED, Cobham (GB)

( * ) Notice: Subject to any disclaimer, the term of this patent is extended or adjusted under 35 U.S.C. 154(b) by 289 days.

(21) Appl. No.: 16/174,574

(22) Filed: Oct. 30, 2018

(65) Prior Publication Data
US 2019/0131838 A1 May 2, 2019

(30) Foreign Application Priority Data

Oct. 30, 2017 (GB) ..................................... 1717871

(51) Int. Cl.
*H02K 1/27* (2006.01)
*H02K 19/26* (2006.01)
*H02K 19/12* (2006.01)
*H02K 1/26* (2006.01)
*H02K 16/02* (2006.01)

(52) U.S. Cl.
CPC ............. *H02K 1/2766* (2013.01); *H02K 1/26* (2013.01); *H02K 1/2713* (2013.01); *H02K 1/2753* (2013.01); *H02K 1/2786* (2013.01); *H02K 19/12* (2013.01); *H02K 19/26* (2013.01); *H02K 16/02* (2013.01); *H02K 2201/06* (2013.01)

(58) Field of Classification Search
CPC .. H02K 1/2766; H02K 1/2713; H02K 1/2753; H02K 1/2786; H02K 1/26; H02K 19/26; H02K 19/12; H02K 2201/06; H02K 16/02

USPC ..................................................... 310/156.07
See application file for complete search history.

(56) References Cited

U.S. PATENT DOCUMENTS 3,334,254 A * 8/1967 Kober .................... H02K 21/24
                                                    310/156.07
4,127,786 A * 11/1978 Volkrodt ................ H02K 1/276
                                                    310/156.84
(Continued)

FOREIGN PATENT DOCUMENTS

CN          102761211 A    10/2012
DE    10 2013 225238 A1     6/2015
(Continued)

OTHER PUBLICATIONS

Atallah, K and Wang, J .A rotor with axially and circumferentially magnetized permanent magnets, IEEE Transactions on Magnetics, Nov. 2012, pp. 3230-3233.

*Primary Examiner* — Forrest M Phillips
(74) *Attorney, Agent, or Firm* — Maschoff Brennan

(57) ABSTRACT

The current invention relates to a magnetic pole arrangement comprising a plurality of magnetic pole assembles arranged back-to-back along a longitudinally extending axis of rotation X. Each providing flux to an air gap G. Each magnetic pole assembly comprising one or more magnetic poles pieces and two components of magnetic flux. The first component of magnetic flux provided by a plurality of axially magnetised axially displaced magnets arranged in circumferentially extending arrays. The second component of magnetic flux provided by a plurality of circumferentially magnetised magnets circumferentially spaced around the axis of rotation X.

20 Claims, 19 Drawing Sheets

(56) References Cited

U.S. PATENT DOCUMENTS

| | | |
|---|---|---|
| 4,481,437 A | 11/1984 | Parker |
| 4,725,750 A | 2/1988 | Welch |
| 5,034,715 A | 7/1991 | Leupold |
| 5,952,758 A | 9/1999 | Lucidarme et al. |
| 6,144,132 A * | 11/2000 | Nashiki ............... H02K 1/2713 <br> 310/152 |
| 6,323,572 B1 * | 11/2001 | Kinoshita ............ H02K 1/2766 <br> 310/156.07 |
| 6,653,920 B1 | 11/2003 | Chen |
| 6,833,647 B2 * | 12/2004 | Saint-Michel ......... H02K 21/24 <br> 310/156.31 |
| 7,911,103 B2 * | 3/2011 | Saint-Michel ....... H02K 1/2706 <br> 310/156.43 |
| 2005/0127769 A1 * | 6/2005 | Minagawa ............. H02K 21/24 <br> 310/156.32 |
| 2005/0179337 A1 * | 8/2005 | Hasebe ................. H02K 21/24 <br> 310/268 |
| 2006/0097594 A1 * | 5/2006 | Abou-Akar ........... H02P 27/045 <br> 310/156.01 |
| 2009/0009022 A1 | 1/2009 | Saint-Michel |
| 2011/0050025 A1 | 3/2011 | Coushita et al. |
| 2012/0134820 A1 | 5/2012 | Vance et al. |
| 2012/0139379 A1 * | 6/2012 | Ge ........................ H02K 21/12 <br> 310/156.36 |
| 2012/0228976 A1 | 9/2012 | Petro et al. |
| 2012/0228978 A1 | 9/2012 | Petro et al. |
| 2013/0043754 A1 * | 2/2013 | Zhu ...................... H02K 1/2706 <br> 310/156.07 |
| 2013/0134820 A1 | 5/2013 | Zhu et al. |
| 2013/0241335 A1 | 9/2013 | Vollmer |
| 2014/0375162 A1 | 12/2014 | Kim et al. |
| 2016/0247616 A1 | 8/2016 | Smith et al. |
| 2016/0365763 A1 | 12/2016 | Sakurai et al. |
| 2017/0070111 A1 | 3/2017 | Kanda et al. |
| 2019/0103791 A1 * | 4/2019 | Goel ...................... H02K 1/272 |
| 2019/0131838 A1 * | 5/2019 | Chmelicek ............... H02K 1/26 |
| 2019/0341828 A1 * | 11/2019 | Calverley ................ H02K 7/11 |
| 2019/0352774 A1 * | 11/2019 | Chan ..................... H01L 21/6719 |

FOREIGN PATENT DOCUMENTS

| | | |
|---|---|---|
| EP | 1003267 A2 | 5/2000 |
| EP | 1416618 A1 | 5/2004 |
| EP | 1 969 696 A1 | 9/2008 |
| GB | 2567316 X | 4/2019 |
| JP | 2016046897 A | 4/2016 |
| JP | 2016082733 A | 5/2016 |

* cited by examiner

MOTOR

BACKGROUND OF THE INVENTION

The present invention is related to rotating electrical machines and relates particularly but not exclusively to a radial field electric motor and a rotor arrangement for such a motor which focuses the magnetic flux produced and which is able to allow for the axial stacking of multiple rotor assemblies.

Magnetic flux focusing in rotors of rotating electric machines employing magnets as a source of excitation can be realised using various magnetic circuit arrangements (topologies, designs). The purpose of flux focusing is to achieve high magnetic flux density in the air gap between the stator and rotor, possibly even higher than remanent flux density of magnets. Boulder Wind Power, Inc. (US2016247616 (A1): 2016, Aug. 25) introduced several different magnet and pole piece arrangements, utilizing concepts of flux focusing, which can be incorporated in various electrical machine topologies. Traditionally, flux focusing in radial field electrical machines is realized using one or more magnet arrays embedded in rotor made of laminated electrical steel. Well known practical realisations are spoke or V type rotor topologies where consecutive magnets are magnetised so that they oppose each other. In spoke arrangement, the magnets are magnetised in circumferential direction while in V type rotor, flux leaving the magnets has circumferential and radial component. Additional magnets magnetised in radial direction could be added to both topologies in order to limit flux leakage and further boost the air gap flux density. Examples of radial flux focused rotor are disclosed in: Meidensha Electric Mfg Co. Ltd (JP2016082733 (A): 2016, May 16), Wolfgang Volkrodt (U.S. Pat. No. 4,127,786 (A): 1978, Nov. 28), Samsung Electronics Co. Ltd. (US2014375162 (A1): 2014, Dec. 25) and JTEKT CORP (JP2017055493 (A): 2017, Mar. 16). While spoke type topology is an example of one dimensional flux focusing having magnets providing flux only circumferential direction, V type rotor can be seen as two dimensionally focused since magnets provide flux in circumferential as well as radial direction. Two-dimensional flux focusing can also be realised by combining an array of circumferentially magnetised magnets with and array of magnets magnetised in the direction of rotor's axis of rotation (axially magnetised magnets). This concept is disclosed by K. Atallah and J. Wang (A rotor with axially and circumferentially magnetized permanent magnets, IEEE Transactions on Magnetics, November 2012). Magnetic flux generated by both arrays of magnets is guided towards the electrical machine air gap by magnetic pole pieces. Since the magnetic flux enters the pole piece in circumferential and axial direction and leaves it in radial direction, the flux path is distinctly three dimensional. Similarly, magnetic end plates, providing return path for flux generated by the axially magnetised magnets, guide flux in three-dimensional fashion.

It was shown by K. Atallah and J. Wang (A rotor with axially and circumferentially magnetized permanent magnets, IEEE Transactions on Magnetics, November 2012) that for the two-dimensional flux focusing arrangements, the flux density in the air gap is highest when the axial length of the rotor is short. This is because of the contribution from axially magnetised magnets. For many applications, it is required to have a rotor with small outer diameter and high axial length (for example, if low inertia is required).

The present invention introduces a concept of three-dimensional flux focusing for rotors of electrical machines. Magnetic field in the pole pieces of an electrical machine rotor is excited by magnetic flux sources providing flux in all three directions in such a way that three-dimensional flux focusing is achieved. Detailed description of various three-dimensional flux focused arrangements is disclosed in this document. Due to the three-dimensional flux focusing, air gap flux density can be substantially higher than remanent flux density of magnets employed in the rotor, thus making it possible to use low cost non-rare earth magnets with low remanent flux density.

Furthermore, sources of magnetic flux prevent flux leakage from pole pieces in their respective direction since they actively oppose it. This is of particular benefit in case of flux leaking in radial direction through rotor hub/shaft which would normally need to be made of non-magnetic and potentially expensive material. The three-dimensional flux focusing eliminates this problem by minimizing radial flux leakage. Since the pole pieces and rotor hub can be made of the same magnetic material, they can also be manufactured as a single body, reducing the number of components in the assembly. It is also shown how a single piece magnet can be used to provide flux in all the three directions, with a benefit of significantly reducing the number of components to assemble and constrain.

The concept of three-dimensional flux focusing and axial stacking presented in this document makes it possible to achieve high air gap flux densities in electrical machines equipped with this rotor despite using weak sources of magnetic flux. Consequently, low cost permanent magnets such as ferrites can be employed instead of high-performance rare earth based permanent magnets which are currently prevalent but suffer from supply chain issues and are substantially more expensive. Electrical machines using this concept show potential to achieve similar efficiency and power density to rare earth based electrical machines, and improved performance over current state-of-the-art (SoA) non-rare earth technologies. Because of this, the presented rotor technology is particularly suitable for applications where high performance, low cost and robustness is required. Additionally, stable supply of ferrite magnets enables relatively low risk high volume production. Due to all these benefits, the invention has the potential to accelerate wide spread adoption of environmentally friendly technologies. Among applications which are most likely to benefit from the present invention are reduced or zero emission automotive traction and renewable power generation.

The invention discloses the concept of flux focusing in all the three dimensions around the magnetic poles of the rotor in order to improve the density of flux through the poles and hence the performance of the rotor. This is achieved using novel magnet topology or arrays of magnets such that when put together, provide flux in the circumferential, axial as well as radial directions of the rotor and focuses the flux through the magnetic poles of the rotor.

The invention also discloses a method of reducing the radial dimensions of the rotor without compromising the performance, and potentially improve the generated torque. This method involves stacking of the flux-focusing units in the rotor's axial direction.

BRIEF SUMMARY OF THE INVENTION

According to a first aspect of the current invention a magnetic pole arrangement having a longitudinally extending axis of rotation X and comprising a plurality of magnetic pole assemblies is arranged back-to-back along said longitudinally extending axis of rotation X. Each magnetic pole assembly providing flux to an air gap G. Each magnetic pole assembly may comprise one or more magnetic pole pieces and two components of magnetic flux. Each magnetic pole piece may include a first axial face, a second axial face a first circumferential face, a second circumferential face, a radially inner surface and a radially outer surface. Said first component of magnetic flux may comprise a plurality of first and second axially displaced axially magnetised magnets. Said axially magnetised magnets having a north side N and a south side S may be arranged in respective circumferentially extending arrays adjacent respective first and second axial faces of said one or more magnetic pole pieces. Said second component of magnetic flux may comprise a plurality of circumferentially magnetised magnets. The circumferentially magnetised magnets each having a north side N and a south side S may be circumferentially spaced around said axis X relative to each other. The circumferentially magnetised magnets may lie adjacent respective first circumferential faces and respective second circumferential faces of each magnetic pole piece.

According to a further aspect of the current invention each magnetic pole assembly may include first and a second circumferentially and radially extending magnetic plates. Said first plate may contact and extend between the respective first circumferentially extending axially magnetised magnets. Said second plate may contact and extend between respective second circumferentially extending axially magnetised magnets.

Said first plate of a first pole assembly may also form the second plate of a next adjacent pole assembly.

The magnetic pole arrangement may further include a plurality of third components of magnetic flux. Each third components of magnetic flux may comprise a radially magnetised magnet having a north side N and a south side S, and each may be provided adjacent said respective radially inner surfaces or said respective radially outer surfaces of the magnetic pole pieces.

The magnetic pole arrangement may further include a ferromagnetic tube attached to said radially magnetised magnets.

Each of said first component of magnetic flux may comprise a plurality of axially magnetised circumferentially spaced central magnets and a plurality of circumferentially magnetised circumferentially spaced side magnets. Wherein said central magnets and respective side magnets may be arranged in a Halbach array.

According to a further aspect of the present invention the magnetic pole arrangement may comprise circumferentially adjacent pole pieces in which each magnetic pole assembly is arranged in alternating North and South magnetic polarity.

Axially adjacent pole pieces in each magnetic pole assembly may be arranged in alternating North and South magnetic polarity.

Axially adjacent pole pieces in each magnetic pole assembly may be circumferentially skewed or offset relative to each other.

The axially and radially extending circumferentially magnetised second component of magnetic flux may extend axially past the inner faces of said plurality of first and second axially displaced axially magnetised magnets.

The arrangement may include a combined source of said first and second components of magnetic flux. Said combined source of first and second components of magnetic flux may comprise a triangular cross-sectioned structure in which said triangular cross-sectioned structure may have an axially, radially and circumferentially extending first surface confronting an adjacent pole piece and the pole piece may have a circumferential width W which varies along axial direction A.

An alternative arrangement may include a combined source of said first and second components of magnetic flux which may comprise a quadrilateral cross-sectioned magnet having first and second oppositely facing axial surfaces where the surfaces confront adjacent pole pieces and the combined source of said first and second components of magnetic flux may have circumferential width W which varies along axial direction A. The plurality of pole pieces may each having a hexagonal cross-sectioned structure having oppositely facing axially, radially and circumferentially extending end surfaces each confronting a respective face of an adjacent component of magnetic flux.

In a still further alternative arrangement, said magnetic pole pieces may comprise a hexagonal cross-sectioned structure having first and second oppositely facing axially displaced end surfaces and first and second oppositely facing circumferentially displaced side surfaces and said combined source of said first and second components of magnetic flux may comprise a hexagonal cross-sectioned structure having oppositely facing axially, radially and circumferentially extending end surfaces and oppositely facing radially and circumferentially extending blank ends and further include a plurality of radially and axially extending circumferentially spaced supplemental magnets each having first and second oppositely facing axial ends and oppositely facing side surfaces.

Said blank ends of the source of magnetic flux may confront respective first and second axial ends of said supplemental magnets and said side surfaces of said pole pieces may confront respective oppositely facing side surfaces of said supplemental magnets.

Each pole piece may include a pole shoe extending away from a radial surface. The pole shoe may not have a radial source of magnetic flux adjacent thereto. The said pole shoe may include a pole face which is both radially and circumferentially offset relative to the pole piece.

BRIEF DESCRIPTION OF THE SEVERAL VIEWS OF THE DRAWING

The present invention will now be described, by way of example only, with reference to the accompanying drawings, in which:

FIG. 9b shows an axial section view of the electric motor of FIG. 9a

FIG. 10b shows an axial section view of the electric motor of FIG. 10a

DETAILED DESCRIPTION OF THE INVENTION

The present invention is related to three-dimensional flux focused poles able to create flux density in excess of 1 Tesla in the air gap of electrical machines.

Figure 1A:
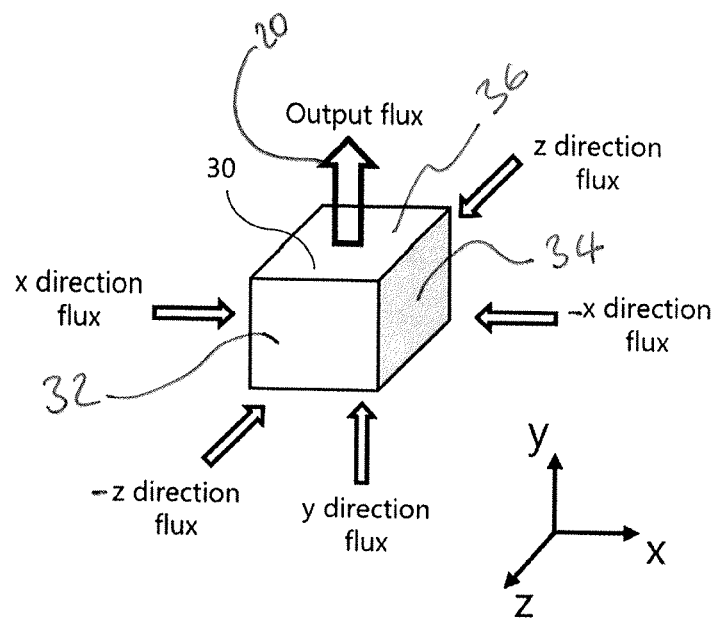
FIG. 1a illustrates focusing of magnetic flux through a magnetic pole piece (guiding element) using input flux from three directions.

FIG. 1a illustrates the concept of three-dimensional flux focusing as a method of providing magnetic flux in three different directions to a magnetic guiding element called pole piece 30, which combines the three-directional flux into a single stream and guides the flux towards the air gap G of an electrical machine. The magnetic pole piece in the preferred embodiment is formed of a ferromagnetic material. In another embodiment the pole piece can be formed of any soft magnetic material. Flux is provided in one or more of x and −x, y, and z and −z directions. Opposing axial faces 32 of the pole piece 30 (z axis) are subject to flux in opposing directions. Opposing circumferential faces 34 of the pole piece 30 (x axis) are subject to flux in opposing directions. Of the radial faces 36 (y axis) a first face may be subject to flux and a second face provides output flux to the air gap G. At the faces flux is provided, the direction relative to the face at which it is provided will be the same. The sources of flux 40, 50, 60 in all the directions are in parallel from an equivalent magnetic circuit point of view such that the total flux is the sum of fluxes provided by each source. It is therefore possible to utilize several relatively weak sources of flux and still achieve high air gap flux density. Each source of magnetic flux 40, 50, 60 for the pole piece 30 must be oriented so that it contributes to the total output flux 20 for the pole piece 30. Each source of magnetic flux also actively supresses leakage of flux in its respective direction. For instance, a source of magnetic flux providing flux in axial direction A acts against leakage of flux in axial direction A.

The three-dimensional flux shown in FIG. 1a is provided in direction of x, y and z axis with reference to a Cartesian coordinate system. If referring to a cylindrical or polar coordinate system the flux is provided in circumferential C, radial R, and axial A directions equivalent to x, y and z respectively, as shown in FIG. 1b.

Figure 1B:
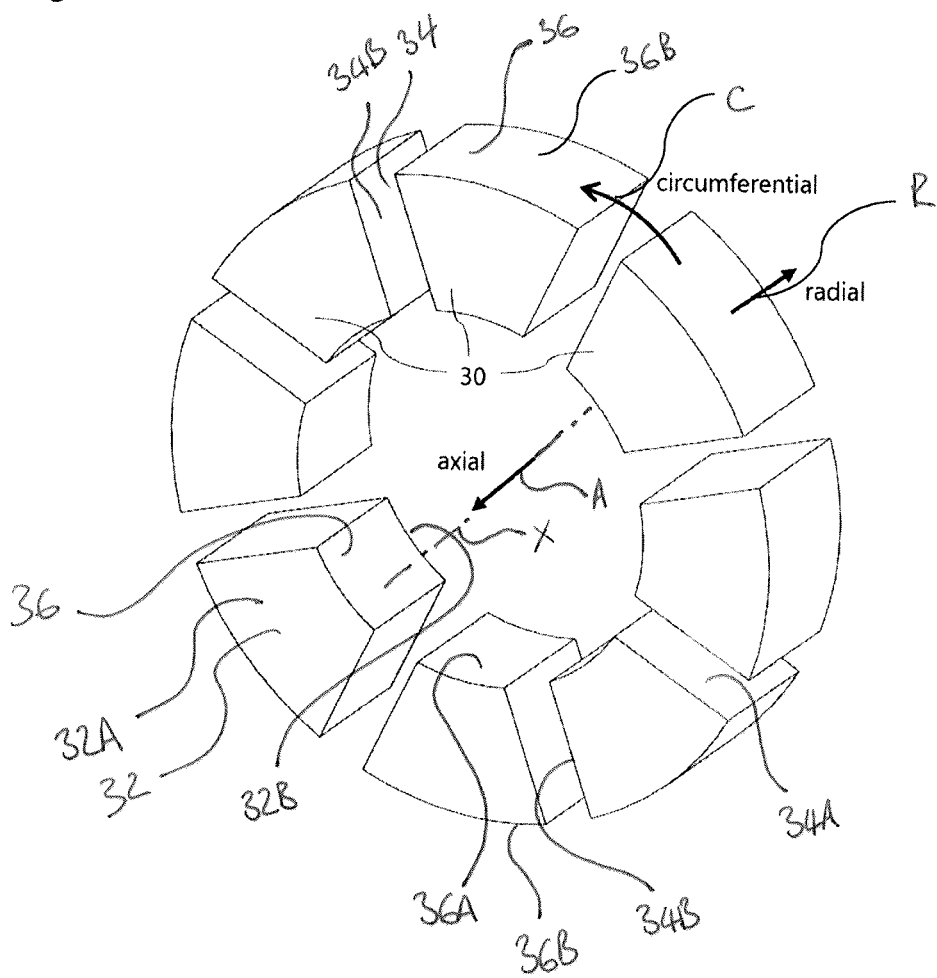
FIG. 1b shows the three directions (axial, radial and circumferential) for a circular array of magnetic pole pieces.

FIG. 1b shows a plurality of magnetic pole pieces 30 arranged in a circular pattern or array. The embodiment shown comprises 8 magnetic pole pieces, but it will be appreciated that one or more pole pieces are possible. Magnetic pole pieces 30 can have radially and circumferentially extending axial faces 32 comprising a first axial face 32A and a second axial face 32B. Magnetic pole pieces 30 can also have axially and radially extending circumferential faces 34 comprising a first circumferential face 34A and a second circumferential face 34B. Magnetic pole pieces 30 can also have axially and circumferentially extending radial surfaces 36 comprising a radially inner surface 36A and a radially outer surface 36B.

Figure 2A:
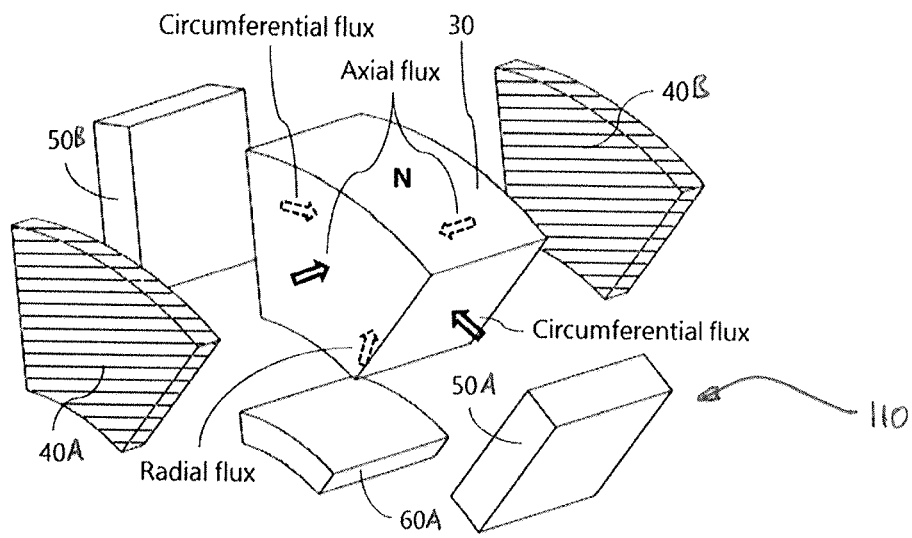
FIG. 2a presents components of one magnetic pole assembly having three-dimensional flux focusing using one magnetic pole piece and 5 block shaped permanent magnets. This arrangement can be used to construct a radial field internal rotor unit as shown in FIG. 2b FIG. 9a and FIG. 9b.
Figure 2B:
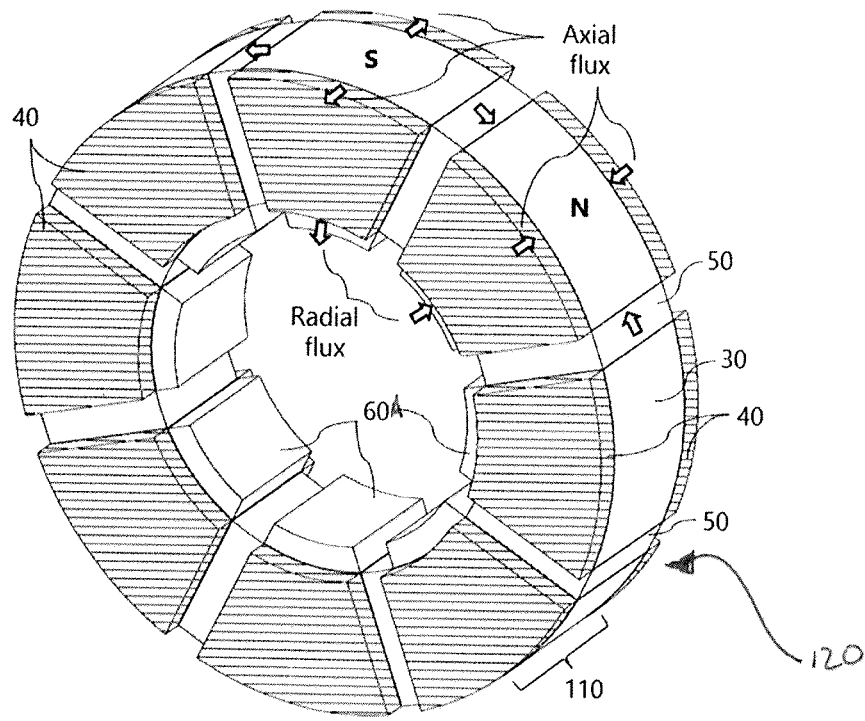
FIG. 2b shows a circular array of magnetic pole assemblies from FIG. 2a to construct a radial field internal rotor unit.

FIG. 2a shows components of a simple three dimensionally flux focused pole. It comprises a guiding element (magnetic pole piece 30) and 5 block shaped magnets 40, 50, 60 attached to 5 sides of the magnetic pole piece 30. There are two magnets providing flux in axial and circumferential directions (axially magnetised magnets 40 and circumferentially magnetised magnets 50) and one providing flux in radial direction (radially magnetised magnet 60). The sixth side of the pole piece 30 with no magnet attached is the side adjacent to the air gap. In an electrical machine, such configuration would represent a single pole and would be combined with other similarly looking elements into a circular array providing number of magnetic poles, as depicted in FIG. 2b. As shown in FIG. 2b, the polarity (N or S) of the magnetic pole depends on the direction of magnetisation of the magnets 40, 50, 60. For the purpose of clarity in this document, we term this circular array as 'rotor unit' 120. In some embodiments shown later, several of these 'rotor units' 120 are stacked in the axial direction. This stacked assembly is termed as 'rotor' in this document.

Figure 2C:
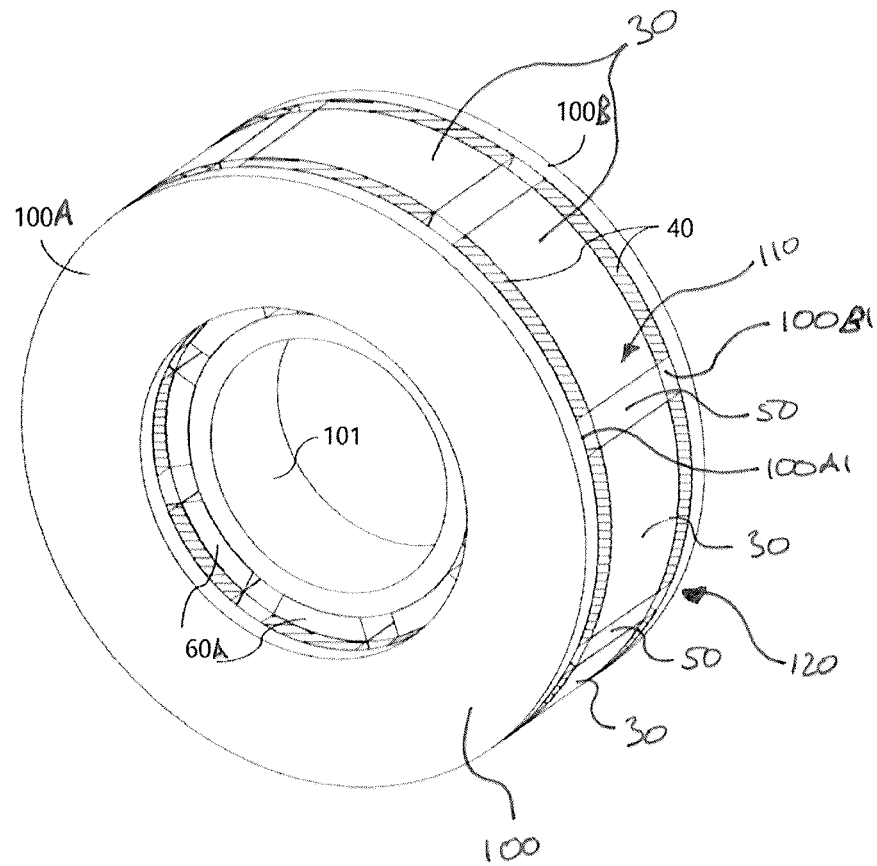
FIG. 2c shows the radial field internal rotor unit of FIG. 2b including ferromagnetic end plates and a magnetic axially extending tubular structure.
Figure 2D:
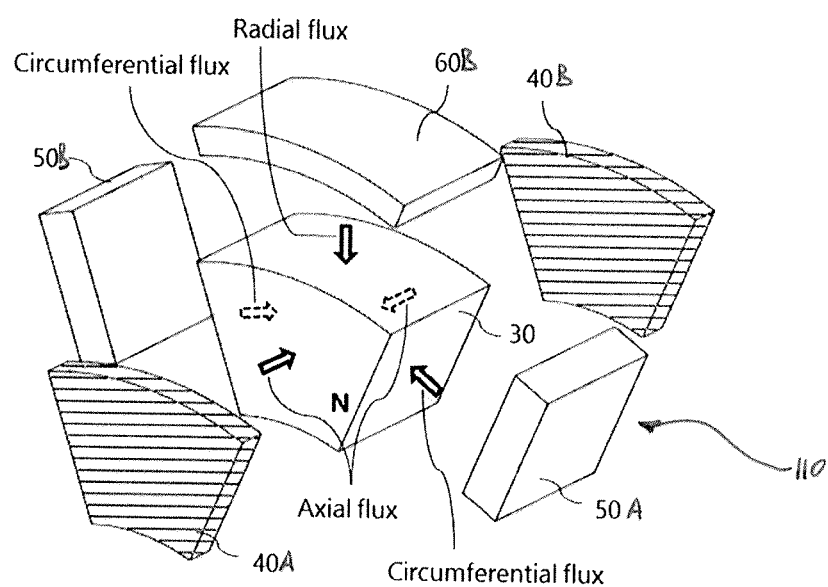
FIG. 2d presents components of one magnetic pole assembly having three-dimensional flux focusing using one magnetic pole piece and 5 block shaped magnets. This arrangement can be used to construct a radial field external rotor unit as shown in FIGS. 2e, 10a and 10b.

FIG. 2a and FIG. 2d show possible embodiments of sources of magnetic flux 40, 50, 60 arranged around a magnetic pole piece 30 to form a magnetic pole assembly 110 for providing focused flux to an airgap G. The first source of magnetic flux 40 comprises a first radially and circumferentially extending segment 40A and a second radially and circumferentially extending segment 40B which is axially displaced along axis X from the first 40A. Respective sources of magnetic flux 40A, 40B lie adjacent respective axial faces 32A, 32B of a pole piece 30. The second source of magnetic flux 50 comprises a first and second axially and radially extending circumferential segment 50A, 50B which lie adjacent respective circumferential faces 34A, 34B of the pole piece 30. The third source of magnetic flux 60 comprises circumferentially and axially extending first and second radial segments 60A, 60B which are radially displaced relative to each other and lie adjacent respective first and second radial faces 36A, 36B of the pole piece 30. The arrangement described above allows flux to flow from the one or more sources of magnetic flux 40, 50, 60 into the one or more magnetic pole pieces 30 in a manner that concentrates the magnetic flux in the manner illustrated in multiple figures by way of outlined arrows. It will be understood that said arrows represent a flow of flux within a magnet from a south pole to a north pole with the arrow head representing the north direction. In FIG. 2a the radial segment 60A is provided on a radially inner surface of the pole piece 30 whilst in FIG. 2d the radial segment is provided on the radially outer surface of the pole piece 30. It will be appreciated that one or other of these two arrangements may be used depending on the layout of the assembly but both cannot be used together as this would not allow for flux focussing.

FIG. 2a and FIG. 2b show the magnetic flux provided by the pole pieces 30 and the sources of magnetic flux 40, 50, 60 in an assembled state. The pole pieces 30 each have a north side N and a south side S radially displaced from one another. The first one or more axial sources of magnetic flux 40 comprise axially magnetised magnets having a north side N and a south side S displaced axially along Axis X from each other. The second one or more circumferential sources of magnetic flux 50 comprise circumferentially magnetised magnets having a north side N and a south side S displaced circumferentially around axis X relative to each other. The third one or more circumferential sources of magnetic flux 60 comprise radially magnetised magnets having a north side N and a south side S displaced radially relative to each other. Said sources of magnetic flux 40, 50, 60 lying with same side adjacent to the pole piece 30 as the pole piece presents to the air gap i.e. if the pole piece presents its north side N to the air gap the sources of magnetic flux will lie with their north sides adjacent to the pole piece.

Figure 9A:
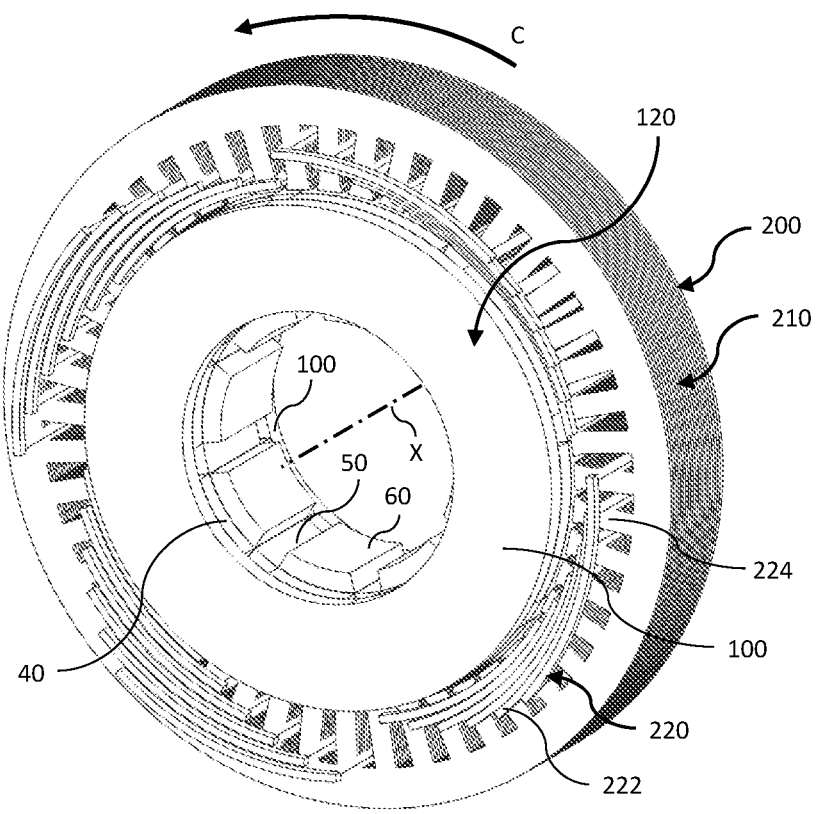
FIG. 9a shows a circular array of magnetic pole assemblies forming a radial field internal rotor unit including ferromagnetic end plates and a stator assembly comprising a laminated stator and a plurality of electromagnets, together forming an electric motor.
Figure 9B:
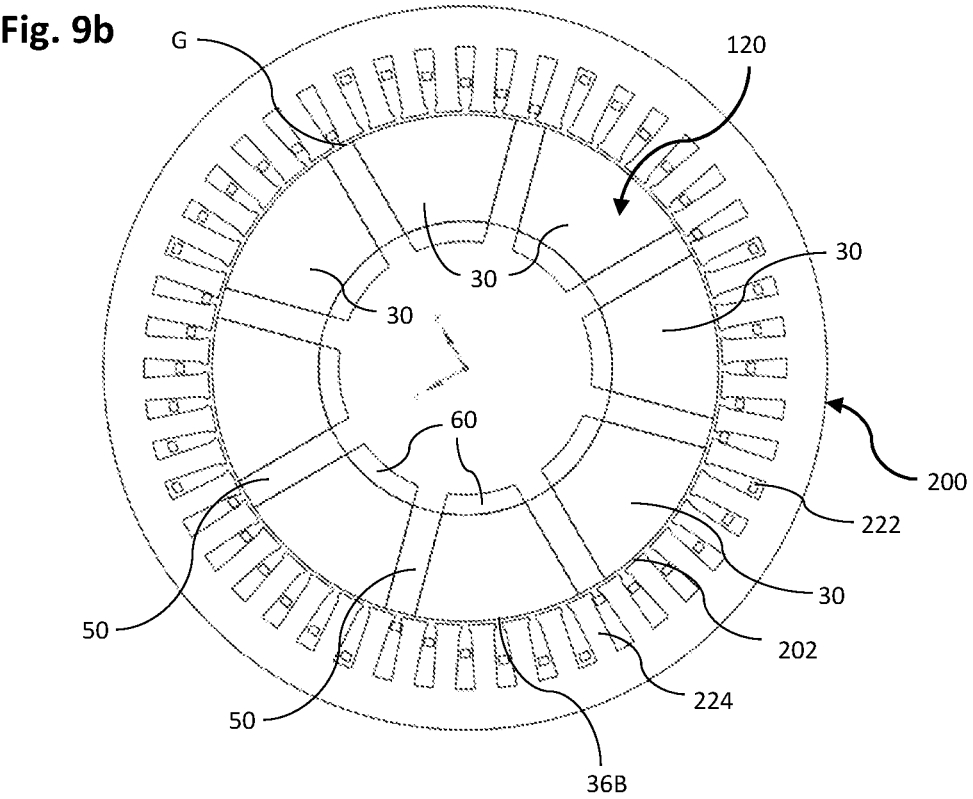

The one or more sources of magnetic flux 40, 50, 60 together with the pole piece 30 create a single magnetic pole assembly 110. A plurality of the magnetic pole assemblies 110 arranged in a circular pattern or array around an axis of rotation X creates a radial field rotor unit 120. In the preferred embodiment the plurality of magnetic pole assemblies 110 comprising a plurality of pole pieces 30, the consecutive pole pieces having alternate magnetic polarity as displayed in FIG. 2b. In an alternative arrangement the plurality of magnetic pole assemblies 110 comprising a plurality of pole pieces 30, the magnetic polarity of the pole pieces alternating every other pole piece. Pole pieces 30 are typically employed in electrical machines in this fashion to provide electromagnetic excitation FIG. 2a shows a magnetic pole assembly 110 suitable for use in the radial field internal rotor unit shown in FIG. 2b. In this embodiment one or more sources of magnetic flux lie adjacent to the radially inner surface 36A but not the radially outer surface 36B. The radially outer surface 36B being adjacent to the air gap G when used in an electric motor as shown in FIGS. 9a and 9b.

Figure 2E:
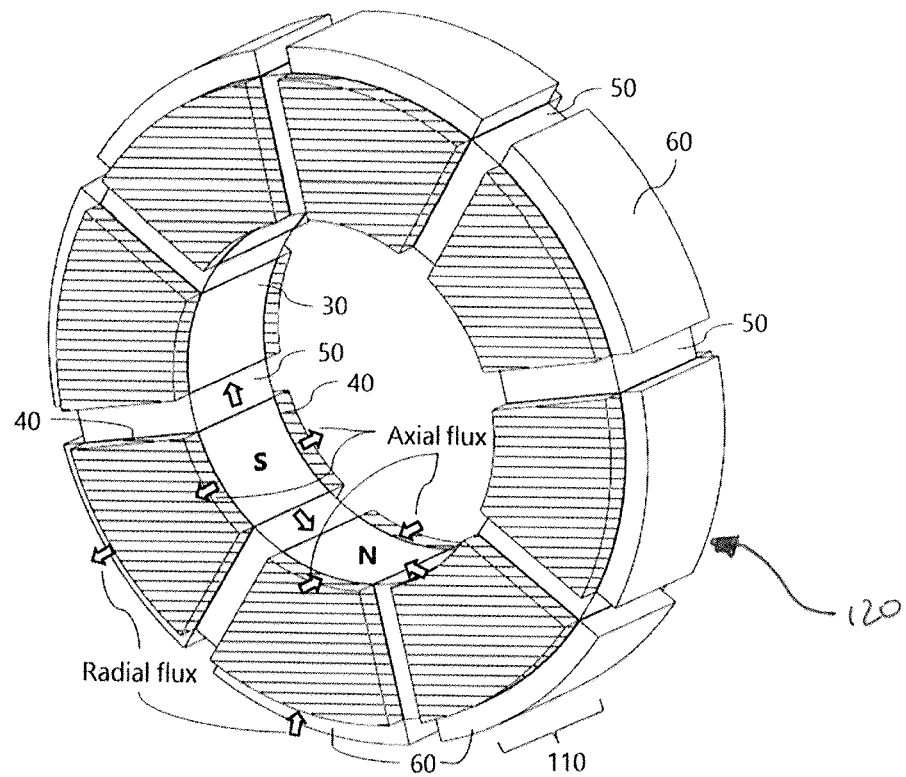
FIG. 2e shows a circular array of magnetic pole assemblies from FIG. 2d to construct a radial field external rotor unit.
Figure 10A:
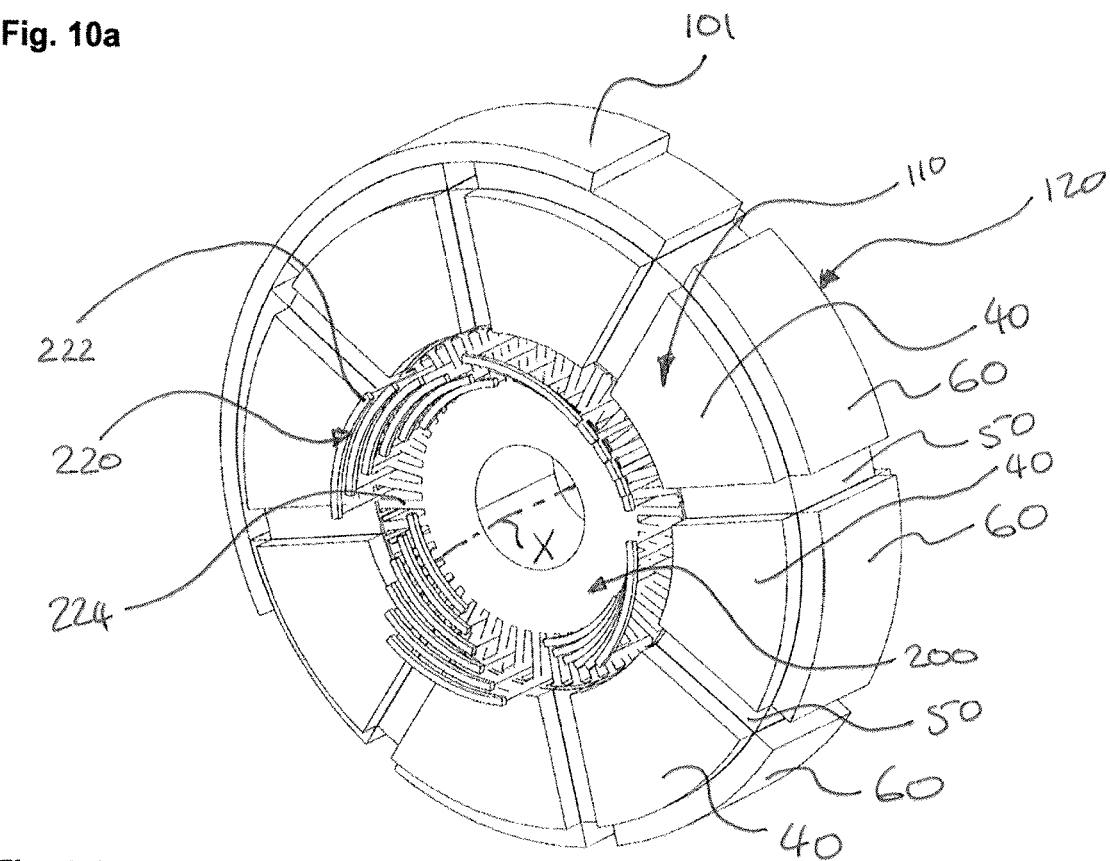
FIG. 10a shows a circular array of magnetic pole assemblies forming a radial field external rotor unit including a section view of the axially extending tubular structure and a stator assembly comprising a stator and a plurality of electromagnets, together forming an electric motor.
Figure 10B:
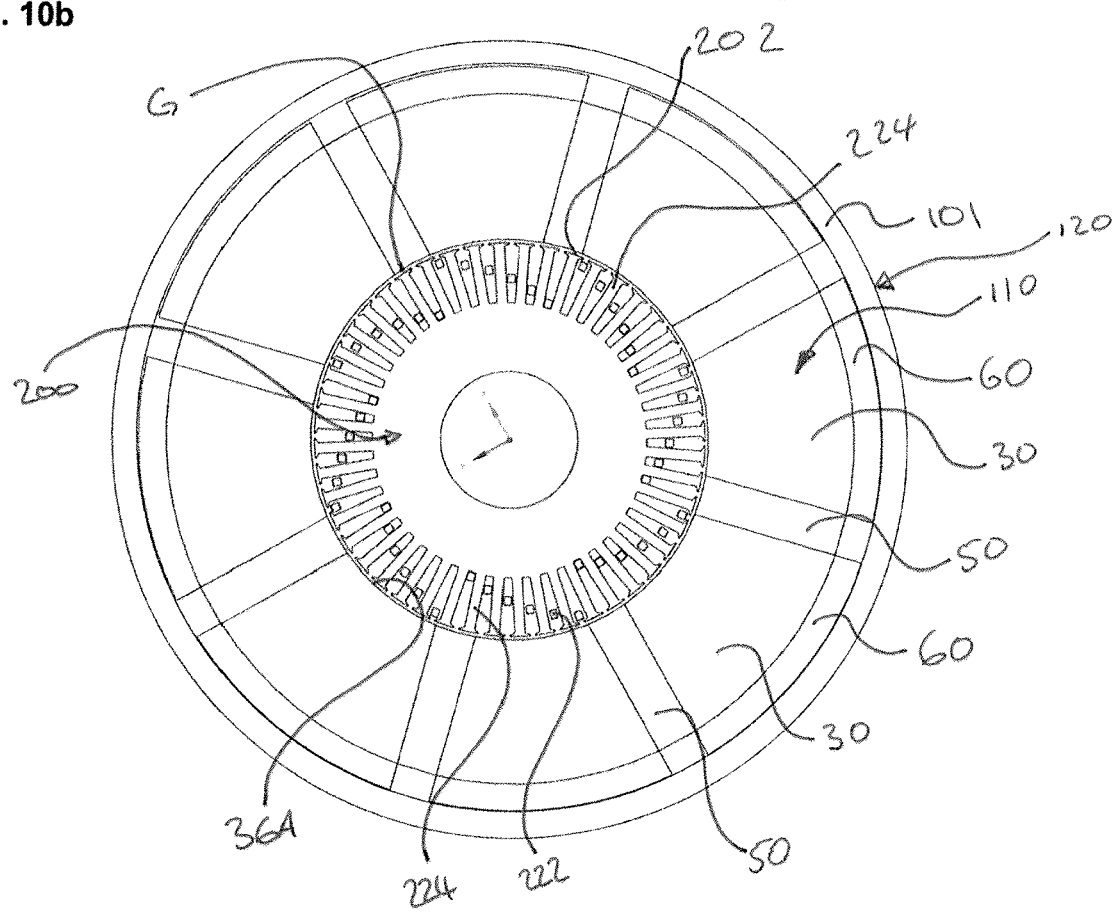

FIG. 2d shows a magnetic pole assembly 110 suitable for use in the radial field external rotor unit shown in FIG. 2e. In this embodiment one or more sources of magnetic flux lie adjacent to the radially outer surface 36B but not the radially inner surface 36A. The radially inner surface 36A being adjacent to the air gap G when used in an electric motor as shown in FIGS. 10a and 10b.

The sources of magnetic flux are arranged to focus the magnetic flux of the pole piece 30 towards and out of the radial surface 36 not having a source of magnetic flux adjacent there to into the air gap G.

Figure 2F:
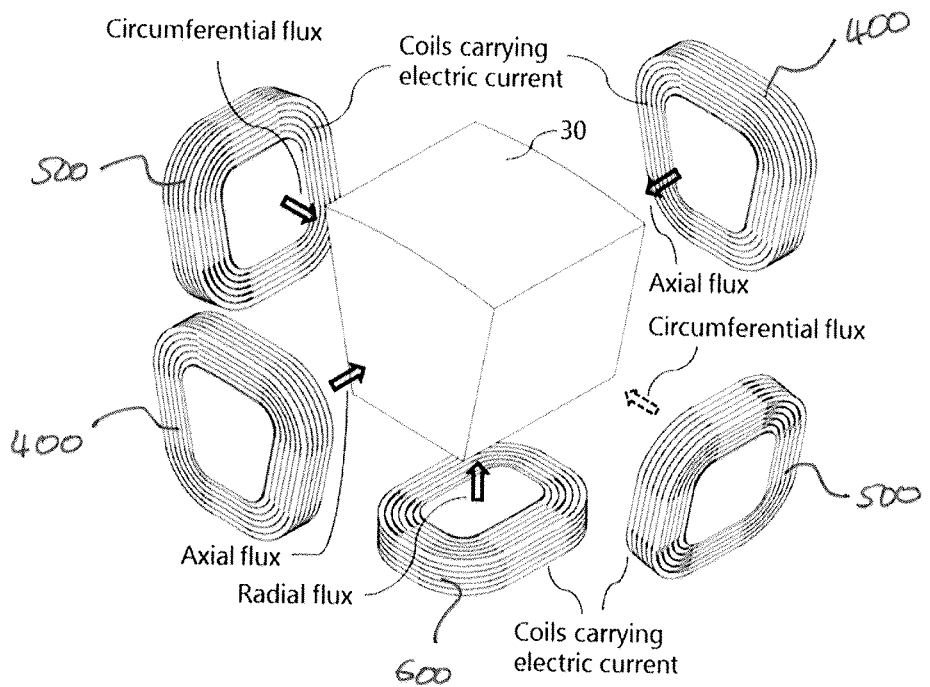
FIG. 2f presents components of one magnetic pole assembly having three-dimensional flux focusing, using one magnetic pole piece and 5 sources of magnetic flux wherein the sources of magnetic flux are constructed using coils carrying electric current.
Figure 2G:
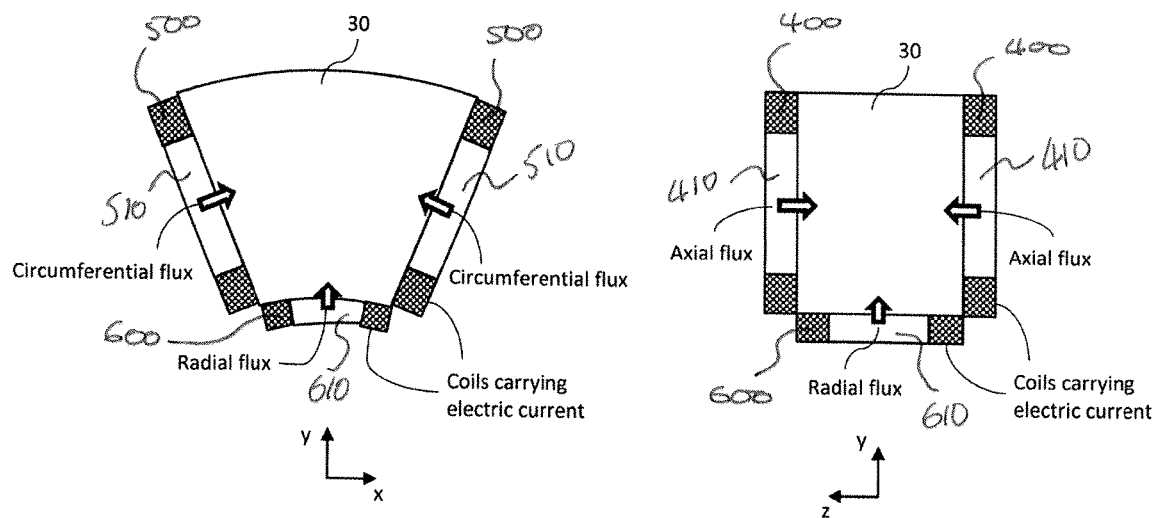
FIG. 2g presents axial and radial cross section views of the magnetic pole assembly of FIG. 2f.
Figure 2H:
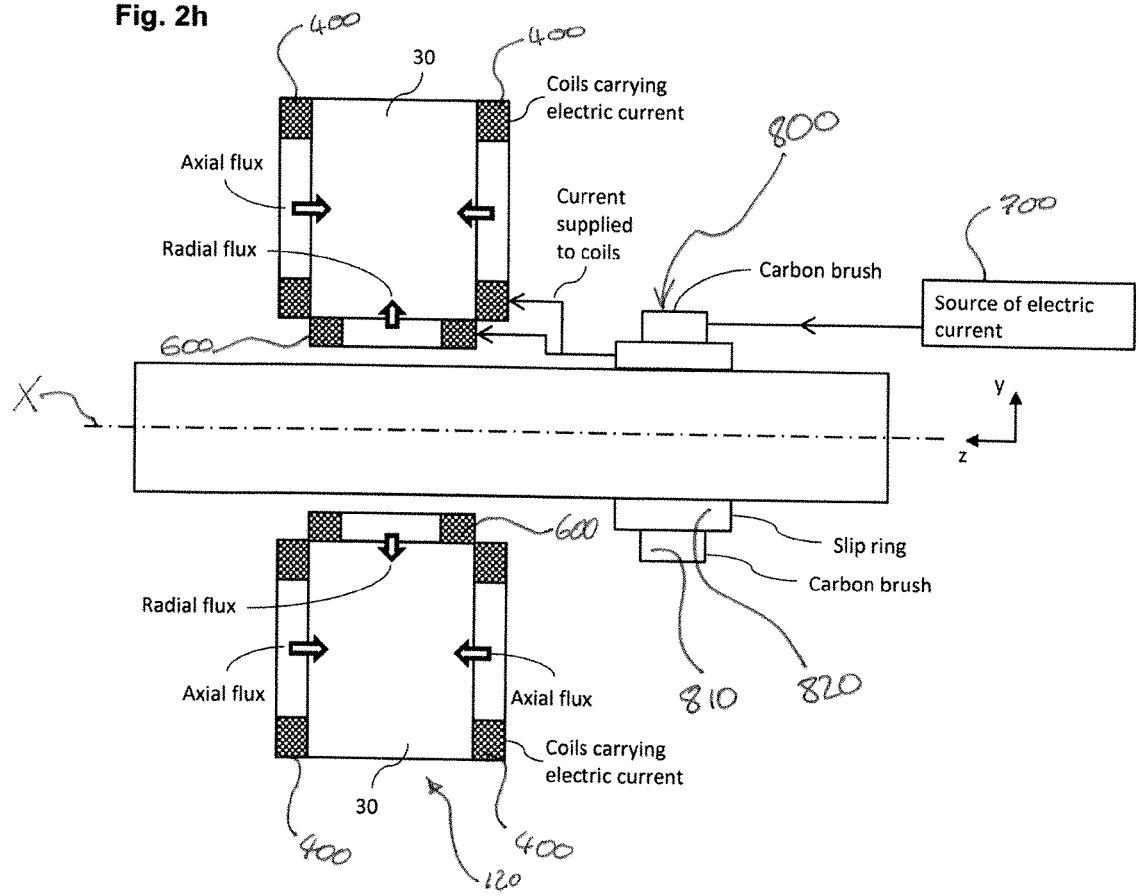
FIG. 2h presents a cross section view of a rotor 130 of an electric motor using a plurality of the magnetic pole pieces of FIG. 2f and FIG. 2g and the electrical supply to the coils of the sources of magnetic flux of FIG. 2f and FIG. 2g.

The one or more sources of magnetic flux 40, 50, 60 utilized in the 3D flux focused magnetic pole assemblies of the preferred embodiment are permanent magnets as shown in FIG. 2a-e. However, in an alternative arrangement, as shown in FIG. 2f-h, the one or more sources of magnetic flux 40, 50, 60 are electro-magnets comprising coils 400, 500, 600 carrying electric current. In another embodiment the source of magnetic flux 40, 50, 60 is a combination of coils 400, 500, 600 carrying electric current and permanent magnets or any other source of magnetic flux may be used. The coils 400, 500, 600 may be wrapped around a core of magnetic material 410, 510, 610. The coils 400, 500, 600 may be supplied by electric current from a source of electric current 700. Said electrical current passing from the stationary source of electric current 700 to the coils 400, 500, 600 on the rotating magnetic pole assembly 110 by way of a carbon brush 810 and slip ring 820 assembly 800.

Although, a radial field internal rotor unit 120 is shown in FIG. 2b and FIG. 2c, the same concept of three-dimensional flux focusing can be used to construct a radial field external rotor unit 120 as shown in FIG. 2e. In FIG. 2d, one pole for the radial field external rotor unit is depicted where the face at the inner radius of the pole piece 30 is adjacent to the air gap and the radially magnetised magnet 60 is placed on the face located at outer radius of the pole piece 30. A circular array of such poles with alternating magnetic polarity creates the rotor unit 120 shown in FIG. 2e.

In addition to the sources of magnetic flux 40, 50, 60 and the flux guiding element or magnetic pole piece 30, further magnetic components can be provided for the purpose of further improving effectiveness of three-dimensional flux focusing. For instance, ferromagnetic plates 100 (shown in FIGS. 2c and 9a) can provide return path for flux generated by the axial sources of magnetic flux or magnetised magnets 40 and effectively reduce reluctance of flux path for any of the flux sources. In one embodiment said ferromagnetic plates 100 extend radially and circumferentially. The ferromagnetic plates 100 can comprise a first ferromagnetic plate 100A and a second ferromagnetic plate 100B. Said first and second ferromagnetic plates 100A, 100B can each have a first face 100A1, 100B1. The first face 100A1, 100B1 of the respective first and second plates 100A, 100B adjacent respective first and second segments 40A, 40B. Further additional components such as a ferromagnetic axially extending tubular structure 101 may be included to provided return path for flux and to reduce reluctance of the flux path. For instance, in the embodiment shown in FIG. 2c, FIG. 10a and FIG. 10b, ferromagnetic axially extending tubular structure 101 lies adjacent to radial sources of flux 60. The plates 100 and the tube 101 must be dimensioned so that the flux passing through them will not cause excessive saturation.

In addition, a single component or structure can provide multiple sources of magnetic flux 40, 50, 60 in one or more directions.

Figure 3A:
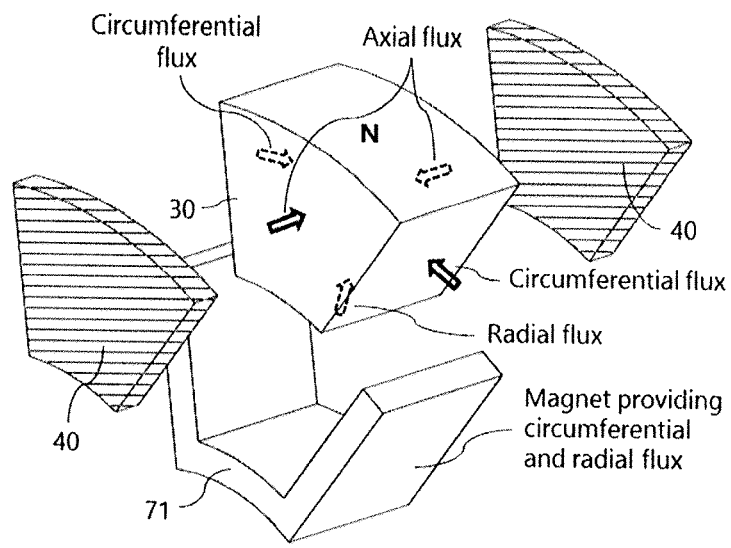
FIG. 3a presents components of one magnetic pole assembly having three-dimensional flux focusing using a unitary magnetic flux source that provides radial and circumferential flux, and a set of sources of magnetic flux providing axial flux.
Figure 3B:
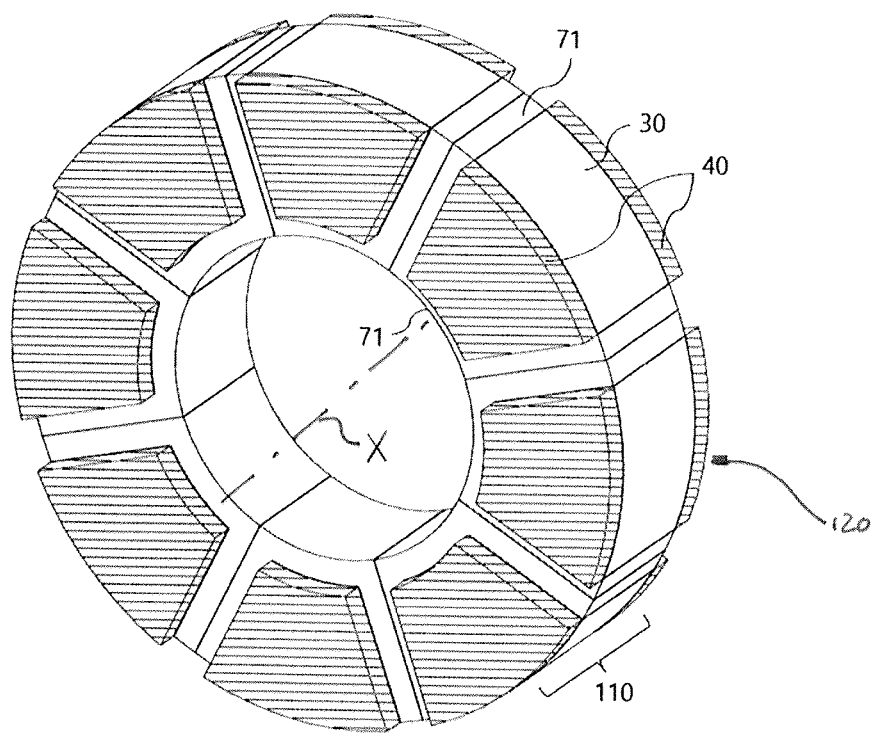
FIG. 3b shows a circular array of magnetic pole assemblies from FIG. 3a to construct a radial field internal rotor unit.

The further embodiment shown in FIG. 3a presents alternative arrangement to that with 5 sources of magnetic flux. A single piece, unitary structure 71, provides a second circumferential source of flux 50 and a third radial source of flux 60 and replaces three out of 5 individual sources of magnetic flux, thus reducing the number of components providing a source of magnetic flux to 3 in order to create a magnetic pole. Here, the single piece, unitary structure 71 provides flux in two of the three directions. Separate axial sources of magnetic flux 40 provide flux in axial direction for each pole, thus realizing the three-dimensional flux focusing for the pole piece 30. This arrangement can be put together in a circular array to construct a radial field internal rotor unit 120 as depicted in FIG. 3b.

Figure 4A:
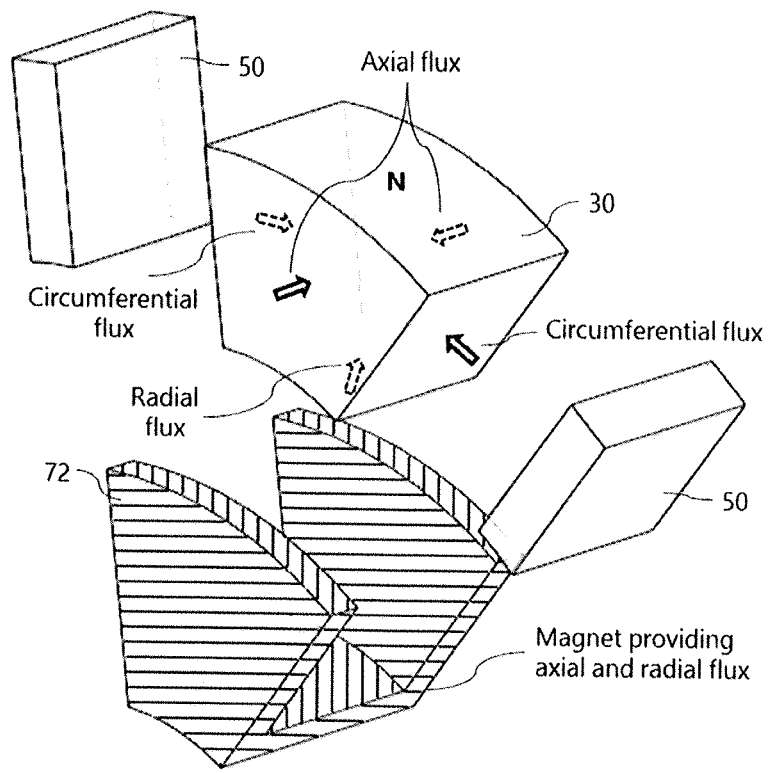
FIG. 4a presents components of one magnetic pole assembly having three-dimensional flux focusing using a unitary magnetic flux source that provides radial and axial flux, and a set of sources of circumferential sources of magnetic flux providing circumferential flux.
Figure 4B:
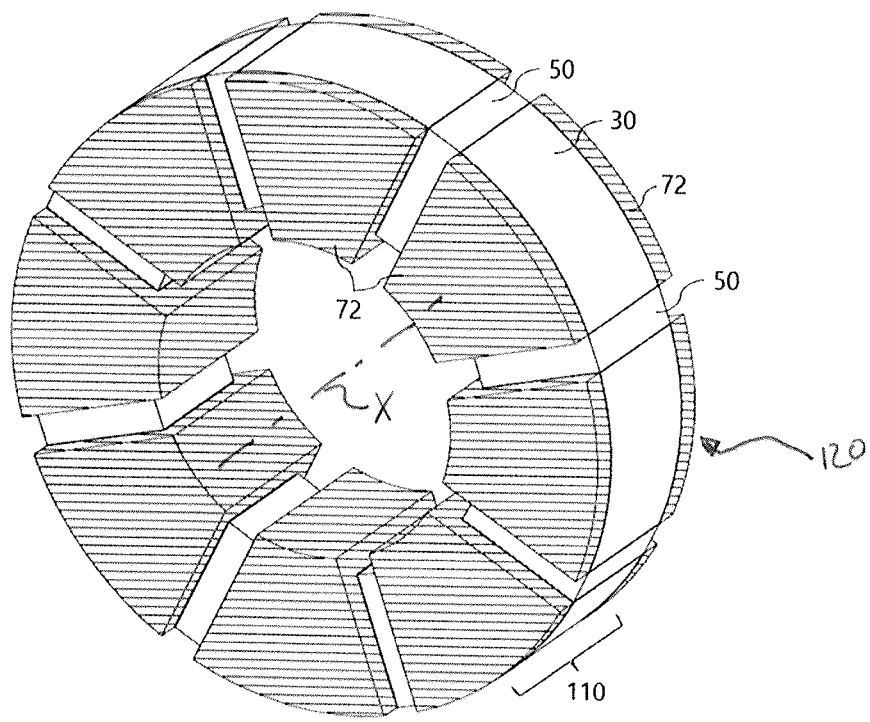
FIG. 4b shows a circular array of magnetic pole assemblies from FIG. 4a to construct a radial field internal rotor unit.

Similarly, FIG. 4a presents another further embodiment of a magnetic pole assembly 110 when a single piece, unitary structure 72 is used to provide a first axial source of flux 40 and a third radial source of flux 60. The source of flux in the circumferential direction is provided by separate sources of circumferential magnetic flux 50. A circular array of this arrangement is shown in FIG. 4b.

Figure 5A:
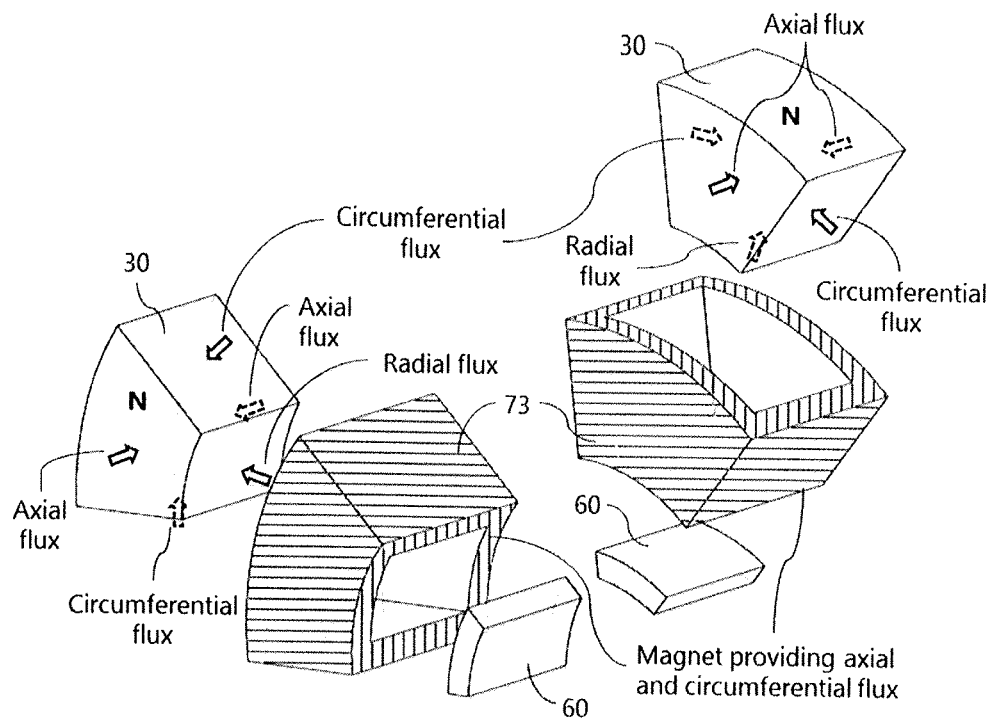
FIG. 5a presents components of one magnetic pole assembly having three-dimensional flux focusing using a unitary magnetic flux source that provides axial and circumferential flux.
Figure 5B:
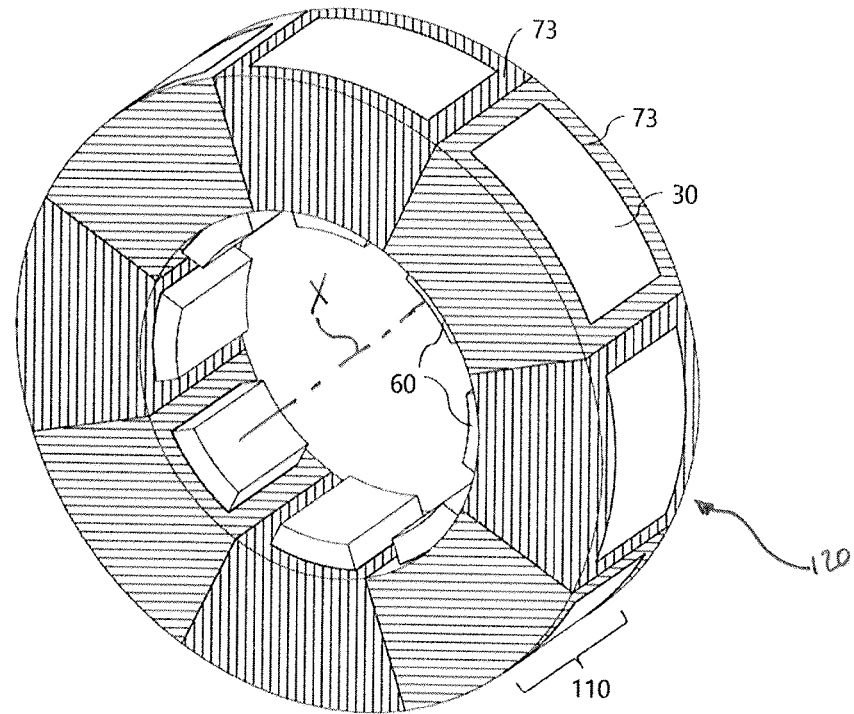
FIG. 5b shows a circular array of magnetic pole assemblies from FIG. 5a to construct a radial field internal rotor unit.

Another alternative embodiment of a magnetic pole assembly 110 is shown in FIG. 5a where a single piece, unitary structure 73 provides a first axial source of magnetic flux 40 and a second circumferential source of magnetic flux. A separate radial source of magnetic flux 60 provides flux in radial direction for each pole. A circular array of this arrangement is shown in FIG. 5b.

Figure 7:
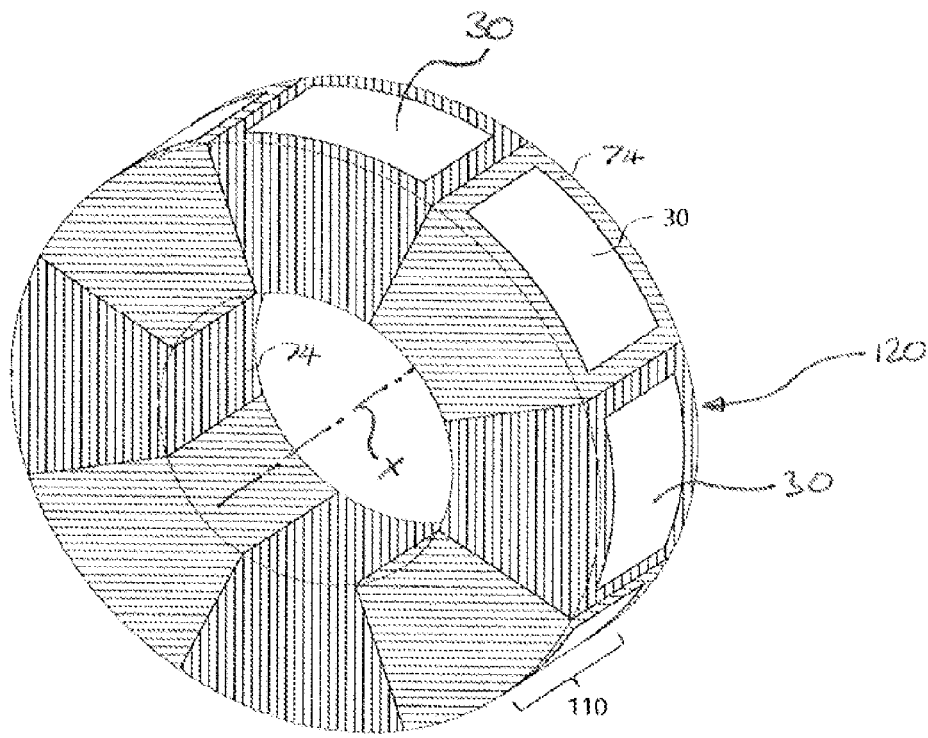
FIG. 7 shows a radial field internal rotor unit where each magnetic pole assembly is constructed using a magnetic pole piece and single cup shaped unitary magnetic flux source providing flux in all the three directions.

The further embodiment shown in FIG. 7 presents an alternative arrangement where the topology and direction of magnetisation of magnets in the magnetic pole assembly 110 is such that a single unitary structure 74 provides a source of magnetic flux 40, 50, 60 in all the three directions: axial, radial and circumferential. The shown topology encloses the magnetic pole pieces 30 across the faces at the inner radius and rotor unit's 110 circumferential and axial directions.

Figure 6A:
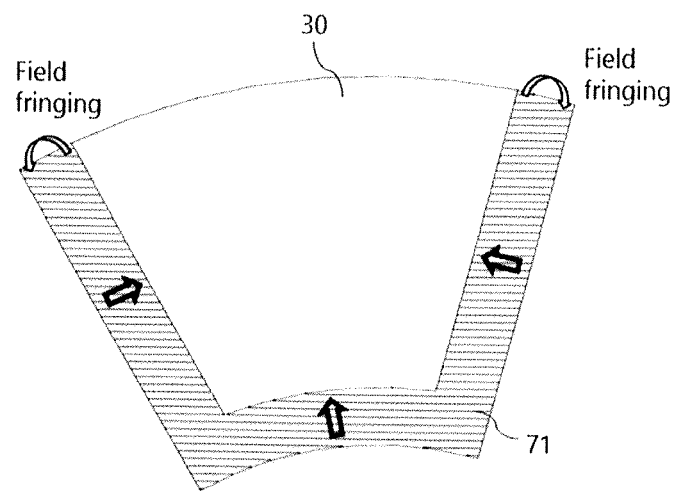
FIG. 6a shows a section view of a magnetic pole assembly having a unitary magnetic flux source providing flux to the magnetic pole piece. Field fringing occurs at two edges.
Figure 6B:
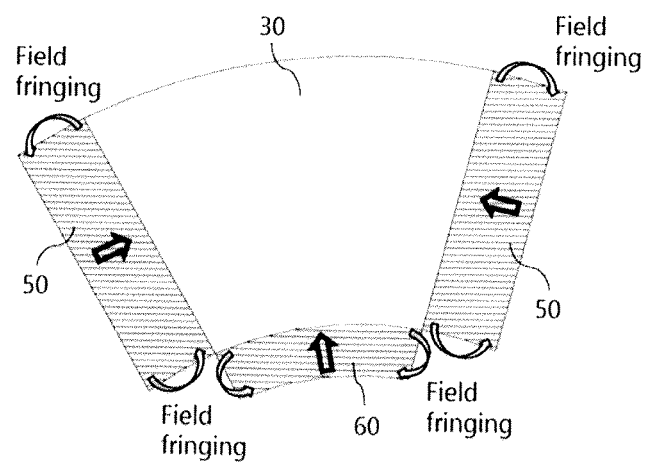
FIG. 6b shows a section view of a magnetic pole assembly having three sources of magnetic flux to the magnetic pole piece. Field fringing occurs at two edges of each magnet.

The advantage of the concepts with the embodiments shown in FIG. 3, FIG. 4 FIG. 5 and FIG. 7 is that it tends to reduce loss of useful magnetic flux due to field fringing near the magnet edges. This phenomenon is shown in FIG. 6. Single piece magnet providing flux in two directions has only two edges where field fringing occurs (FIG. 6a), unlike similar arrangement with 3 separate magnet blocks which has 6 edges where field fringing occurs (FIG. 6b). Field fringing results in increased reluctance and a loss of flux density and a reduction in the flux focusing effect.

Although, a radial field internal rotor unit 120 is shown in these embodiments (FIG. 3b, FIG. 4b FIG. 5b and FIG. 7), the same concept of three-dimensional flux focusing can be used to construct a radial field external rotor unit 120 similar to that illustrated in FIG. 2e by changing the shape or placement of magnets such that the focused radial flux is provided on a face at external radius of the pole piece 30.

Although, a radial field internal rotor unit 120 is shown in this embodiments of FIG. 2, FIG. 3, FIG. 4 FIG. 5 and FIG. 7, the same concept of three-dimensional flux focusing can be used to construct a radial field external rotor unit 120 similar to that illustrated in FIG. 2e by changing the shape or placement of magnets such that the radial flux is provided on a face at external radius of the pole piece 30.

Figure 11A:
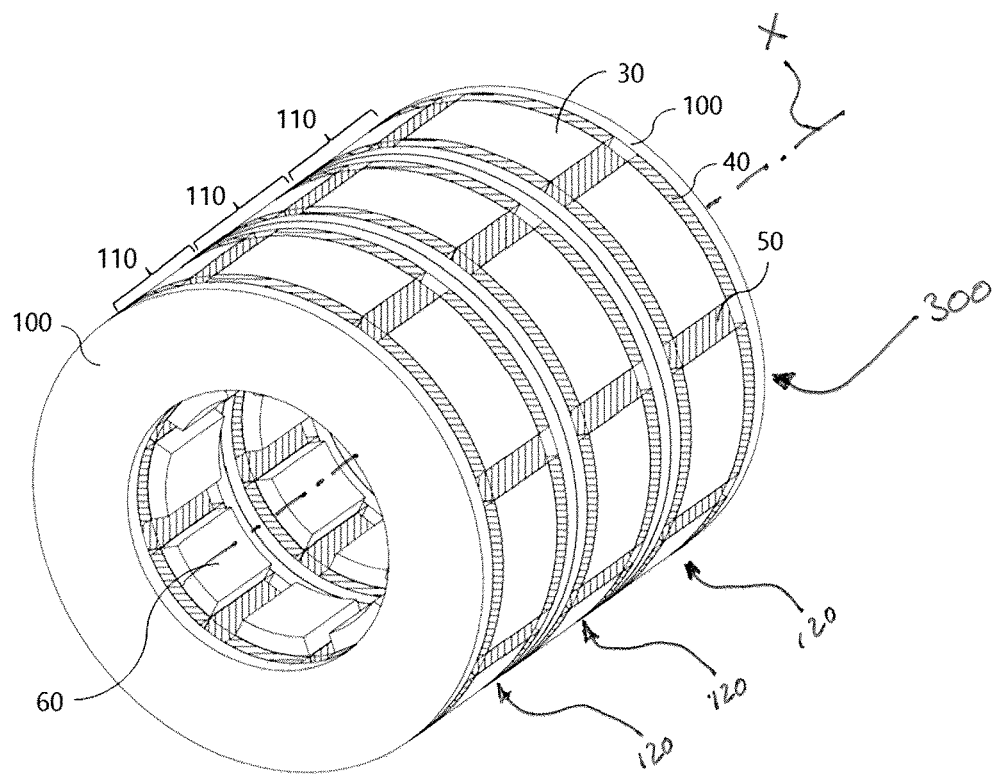
FIG. 11a shows stacking of rotor units in the axial direction.

FIG. 11a shows a simple example of stacking of the individual rotor units 120 shown in FIG. 2b when stacked in the axial direction X and comprising a plurality of magnetic pole assemblies 110 arranged back-to-back along said longitudinally extending axis of rotation X.

The embodiment of the magnetic pole arrangement 300 includes radially and circumferentially extending plates 100A, 100B made of magnetic or ferromagnetic material. said first plate 100A contacting and extending between respective first circumferentially extending axially magnetised magnets 40A and said second plate 100B contacting and extending between respective second circumferentially extending axially magnetised magnets 40B. The active length of the rotor is defined as the portion of the rotor through which magnetic flux enters the air gap. This active length in (illustrated in FIG. 11b) is provided by the axial dimension of the magnetic pole piece 30. The axial length containing plates 100 and axially magnetised magnets 40 does not provide radial flux in the air gap. To increase the active length of a rotor 130 relative to its overall length it is possible for the first plate 100A to also form the second plate 100B of a next adjacent magnetic pole assembly 110 as in FIG. 12a.

In any embodiment it is beneficial for a magnetic pole arrangement 300 if a magnetic return path is provided for the third plurality of radial components of magnetic flux 60 generated by radially magnetised magnets 60. This return path can be provided by axially extending tubular structure 101, hub or shaft made of magnetic or ferromagnetic material. Said axially extending tubular structure 101 can be included in an internal rotor embodiment FIG. 2c or an external rotor embodiment FIGS. 9a and 9b.

It is also possible to implement skewing of the rotor units 120 such that the poles in the neighbouring rotor units are not axially aligned. This is can be implemented by rotation of the whole rotor unit 120 about the axis of the rotor. This skew angle can be adjusted depending on the desired performance of the rotor.

Each rotor unit 120 in this embodiment has an array of radially magnetised magnets 60 placed at the inner radius (below the magnetic pole pieces 30 shown in FIG. 11b) of the magnetic pole pieces 30 as shown in FIG. 11a. This would further improve the flux density in the air gap between rotor and stator.

Although, a radial field internal rotor is shown in this embodiment (FIG. 11a and FIG. 11b), same concept of three-dimensional flux focusing can be used to construct a radial field external rotor using rotor unit 120 similar to that illustrated in FIG. 2e by changing the placement of radially magnetised magnets 60 such that the radial component of flux 60 is provided on a face at external radius of the pole piece 30.

The concept of Halbach array can be used to reduce axial length of the rotor consisting of two or more rotor units 120 and to improve ratio of magnetically active to passive length of the rotor. Halbach array is an array of magnets arranged in such manner that magnetic field on one side (strong side) is strengthened and on the opposite side (weak side) weakened to near zero flux density. This is achieved by having a spatially rotating pattern of magnetisation. A Halbach array comprises a rotating pattern of permanent magnets that can be continued indefinitely and have the same effect. The sequence rotates the field of the magnet 90 degrees for each permanent magnet. The effect is illustrated by the lines 96 in FIG. 12a where lines 94 show the flow of flux through a Halbach Array. Each of said first components of magnetic flux 40A, 40B may comprise a plurality of axially magnetised circumferentially spaced central magnets 97F or 97S and a plurality of circumferentially magnetised circumferentially spaced side magnets 98F, 98S arranged in a Halbach array such that circumferentially adjacent pole pieces 30 in each magnetic pole assembly 110 are arranged in alternating North and South magnetic polarity. As shown, said side magnets 98F, 98S are interposed between respective ones of said central magnets 97F or 97S and are each magnetised in opposite circumferential directions E1, E2 whilst central magnets 97F, 97S are alternately magnetised in different axial directions D1, D2. The combined magnetic effect of said central magnets (97F, 97S) and said side magnets (98F, 98S) is applied to respective adjacent pole pieces 30 in the direction of arrows 96 of FIG. 12a or 12b. The plurality of central magnets 97F or 97S and a plurality of side magnets 98F, 98S may be arranged in a repeating circumferential sequence. The sequence may comprise alternating centre magnets 97F, 97S and side magnets 98F, 98S. The centre magnets 97F, 97S may be arranged with the north side adjacent a magnetic pole piece 30 presenting a north side to the air gap G. The centre magnets 97F, 97S may be arranged with the south side adjacent a magnetic pole piece 30 presenting a south side to the air gap G. The side magnets 98F, 98S in said sequence may be orientated to guide flux from centre magnets 97F, 97S with a south side adjacent a magnetic pole piece 30 to centre magnets 97F, 97S with a south side adjacent a magnetic pole piece 30. In said sequence the magnetic field of each sequential magnet rotates 90 degrees to the last and 180 degrees to the magnet before. Since flux density on the weak side of the Halbach array is nearly zero, there is no need for a plate 100 made of magnetic material to provide return path for the flux generated by the magnets 91 in the array. Because of this, the plates 100 can be eliminated thus reducing axial length of the rotor. While plates 100 can be eliminated, they still may be included to provide mechanical support for the rotor. However, the plate's 100 thickness is not dictated by the need to guide magnetic flux. Additionally, the thickness (axial dimension) of Halbach array magnets 91 can be less than the thickness of axially magnetised magnets 40 shown in the previous embodiment (FIG. 11a and FIG. 11b) because the field on the strong side of Halbach array 91A is boosted compared to field produced by only axially magnetised magnets 40.

Figure 12A:
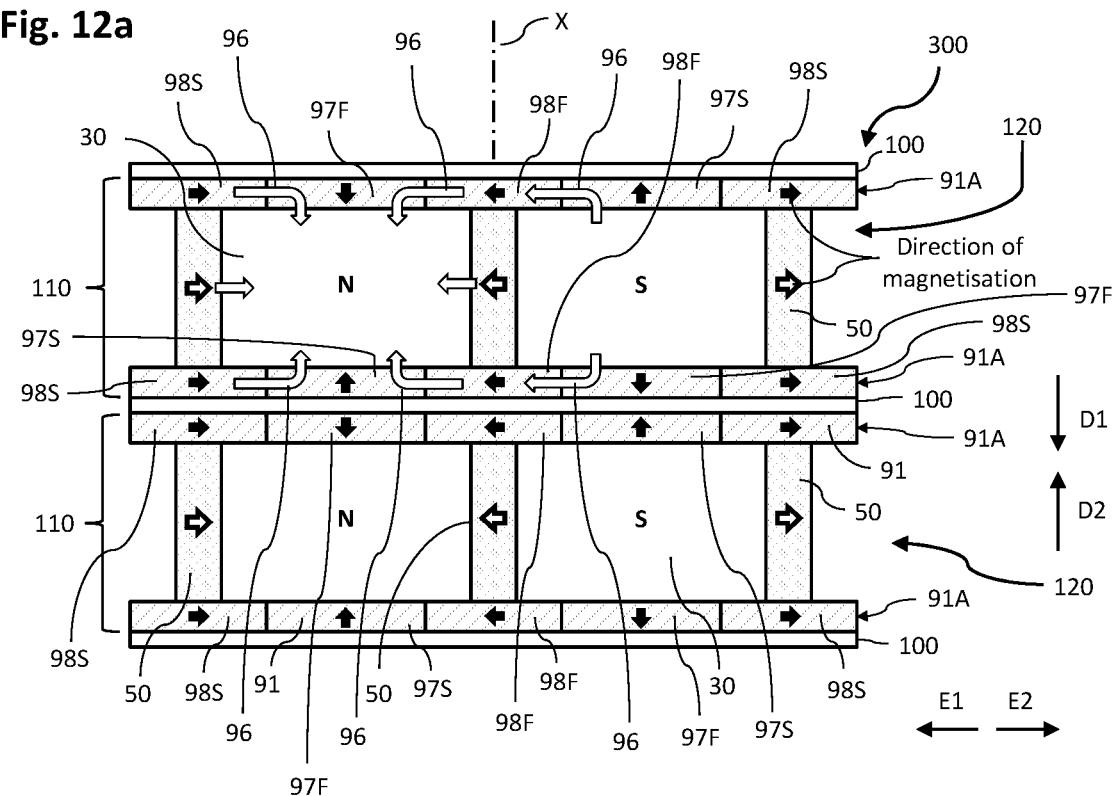
FIG. 12a is a partial external view of the radial field internal rotor when looked along the radial direction. It shows magnetic pole pieces, plates, circumferentially magnetised magnets and axially magnetised magnets arranged in Halbach pattern.
Figure 12B:
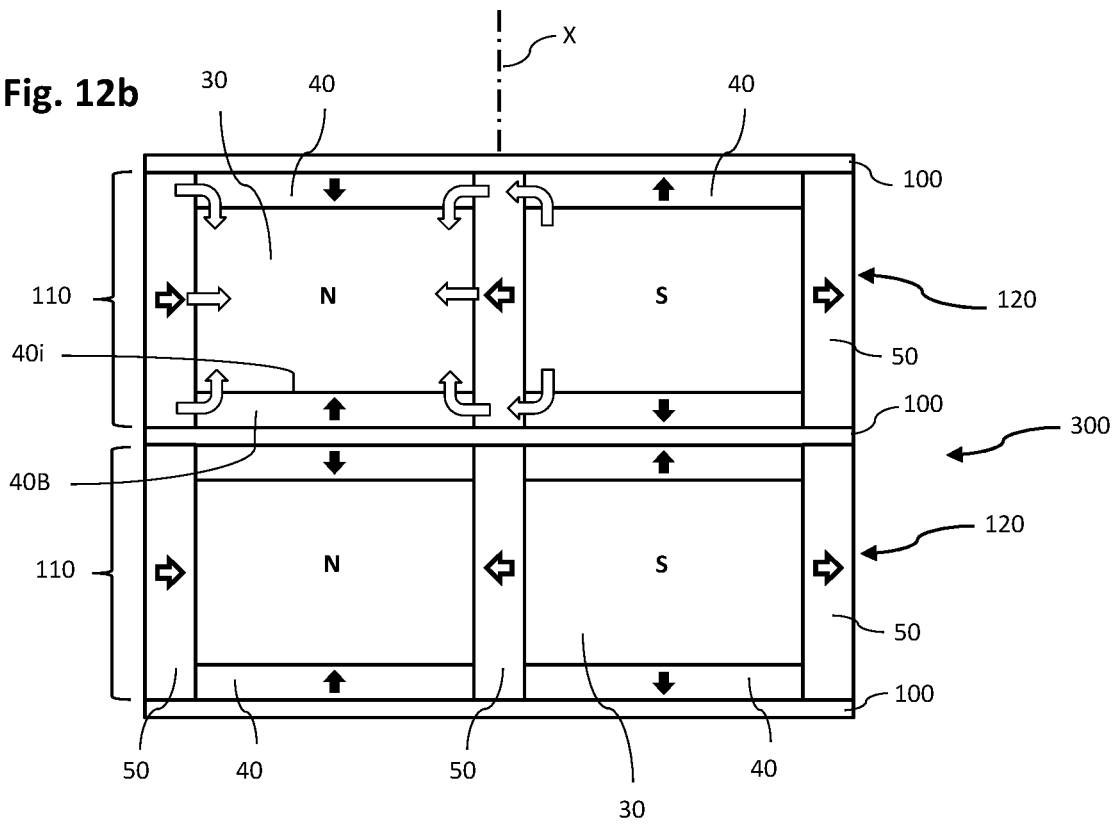
FIG. 12b is a partial external view of the radial field internal rotor when looked along the radial direction. It shows magnetic pole pieces, plates, extended circumferentially magnetised magnets and axially magnetised magnets.

A magnetic pole arrangement 300 can also implement Halbach array concept using an axially longer circumferentially magnetised magnets 50 as shown in FIG. 12b. in this arrangement said axially and radially extending circumferentially magnetised second component of magnetic flux 50 may extend axially past inner faces 40i of said plurality of first 40A and second 40B axially displaced axially magnetised magnets 40. Although not shown in these embodiments, radially magnetized magnets can also be replaced by radial Halbach array having the strong side adjacent to the pole piece.

Each rotor unit 120 in this embodiment can have an array of radially magnetised magnets 60 (as shown in FIG. 11a) placed at the inner radius (below the magnetic pole pieces 30 shown in FIG. 12a and FIG. 12b) of the magnetic pole pieces 30. This would further improve the flux density in the air gap between rotor and stator.

Although, a radial field internal rotor is shown in these embodiments (FIG. 12a and FIG. 12b), same concept of three-dimensional flux focusing can be used to construct a radial field external rotor using rotor unit 120 similar to that illustrated in FIG. 2e by changing the placement of radially magnetised magnets such that the radial flux is provided on a face at external radius of the pole piece 30.

Figure 13:
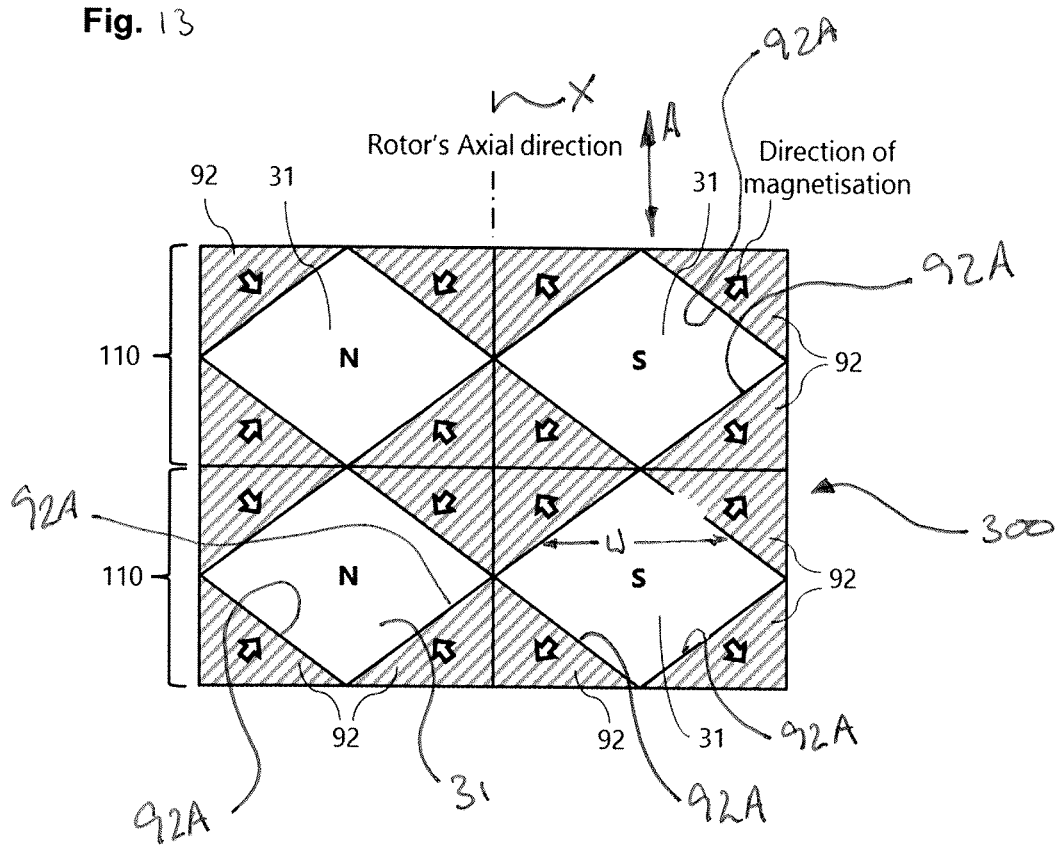
FIG. 13 is a partial external view of the radial field internal rotor when looked along the radial direction. It shows magnetic pole pieces having 4-sided polygonal cross-section and magnets with triangular cross-section.

FIG. 13 shows an embodiment aiming to reduce axial length of rotor consisting of more than one rotor units 120. In this case, axially magnetised magnets and circumferentially magnetised magnets are replaced by a combined source 92 of said first and second magnetic flux 40, 50. This combined source 92 may have a triangular cross-sectioned structure radially. Said combined source 92 may be magnetised to provide both first axial 40 and second circumferential 50 components of magnetic flux as depicted by arrows in FIG. 13. The combined source 92 may have an axially, radially and circumferentially extending first surface 92A confronting an adjacent pole piece 31. Wherein the pole piece 31 may have a circumferential width W which varies along the axial direction A and, in this embodiment, may be diamond shape. The triangular cross-section magnets 92 may have magnetisation direction perpendicular to the pole face to which they provide flux. This means that the vector of flux density entering the magnetic pole pieces 31 has circumferential and axial components, thus providing flux in two directions. This arrangement eliminates the need for plates 100 (as shown in FIG. 11) since magnetic flux is guided from one pole to another through triangular cross-section magnets 92 and therefore doesn't need additional return path. While plates 100 are not necessary from magnetic point of view, they may be included in an alternative embodiment to improve mechanical robustness of the rotor. However, their thickness is not dictated by the need to guide magnetic flux. Each rotor unit 120 in this embodiment can have an array of radially magnetised magnets 60 (as shown in FIG. 11a) placed at the inner radius (below the magnetic pole pieces 31 shown in FIG. 13) of the magnetic pole pieces 31. This would further improve the flux density in the air gap between rotor and stator.

Although, a radial field internal rotor is shown in this embodiment (FIG. 13), the same concept of three-dimensional flux focusing can be used to construct a radial field external rotor using rotor unit 120 similar to that illustrated in FIG. 2e by changing the placement of radially magnetised magnets such that the radial flux is provided on a face at external radius of the pole piece 31.

Figure 14A:
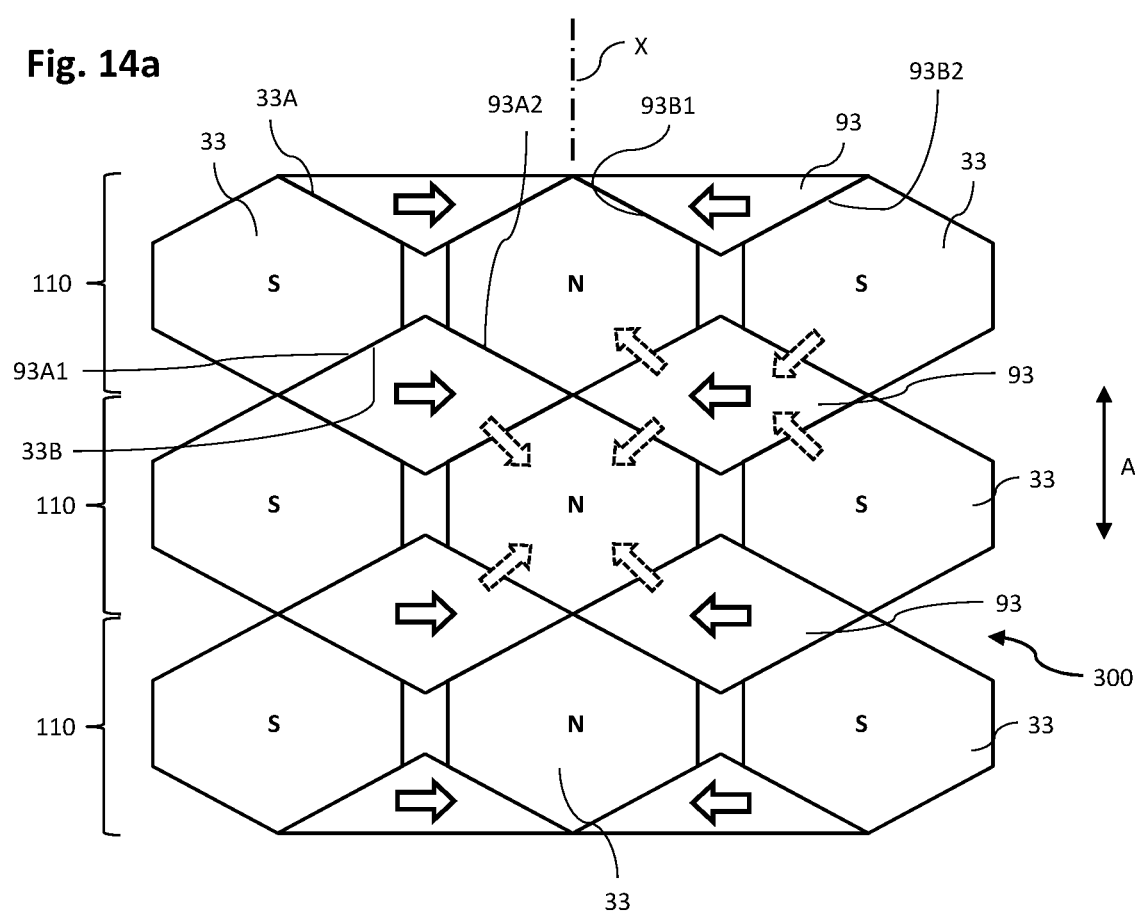
FIG. 14a is a partial external view of the radial field internal rotor when looked along the radial direction. It shows magnetic pole pieces with hexagonal cross-section and magnets with triangular or 4-sided polygonal cross-section.
Figure 14B:
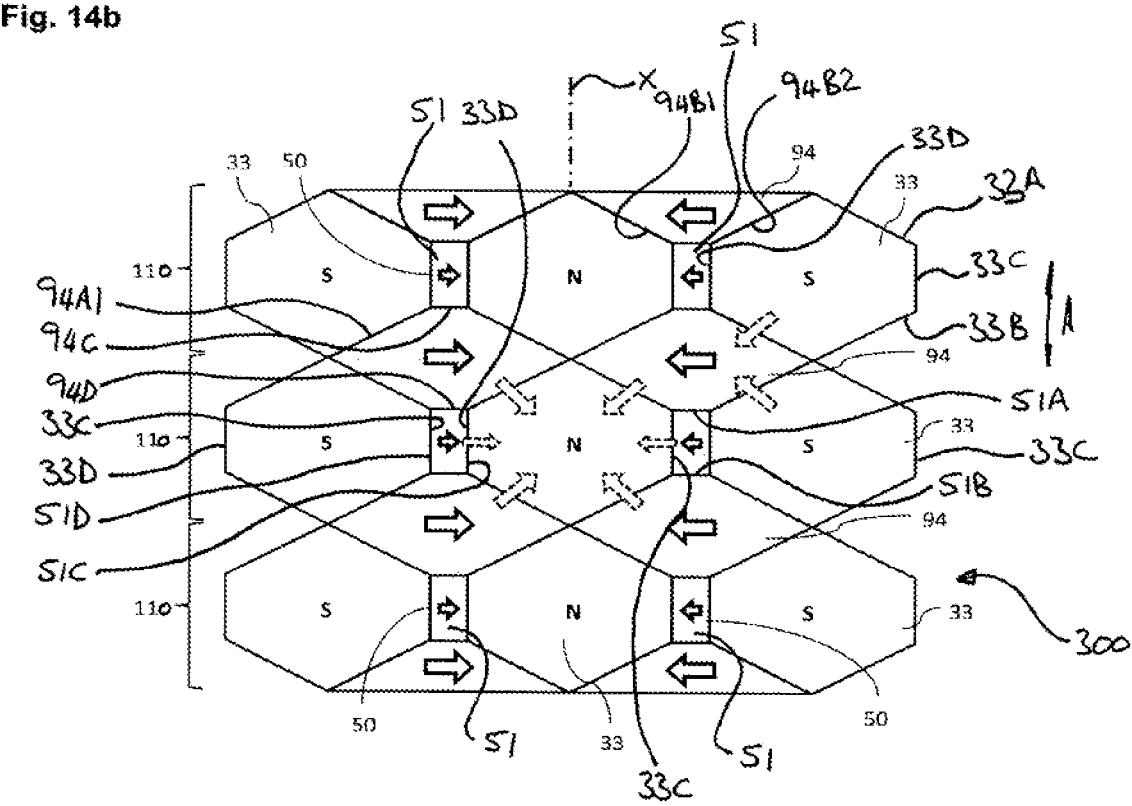
FIG. 14b is a partial external view of the radial field internal rotor when looked along the radial direction. It shows magnetic pole pieces with hexagonal cross-section, magnets with hexagonal cross-section and block shaped circumferentially magnetised magnets.

Similar to the previous embodiment of magnetic pole arrangement 300 shown in FIG. 13, further alternative embodiments depicted in FIG. 14a and FIG. 14b show a magnetic pole arrangement 300 having more than one rotor units 120 comprising a plurality of magnetic pole pieces 33 each having a hexagonal cross-section structure (circumferential width varying with axial length). The magnetic pole piece 33 may also having oppositely facing axially, radially and circumferentially extending end surfaces 33A, 33B and first and second oppositely facing circumferentially displaced side surfaces (33C, 33D). In these embodiments the first and second components of magnetic flux 40, 50 are provided by a combined source.

An alternative arrangement of a magnetic pole arrangement 300 is shown in FIG. 14a and in which said combined source 93 comprises a quadrilateral cross-sectioned magnet 93 having circumferential width W which varies along axial direction X. Said magnet 93 may have first and second oppositely facing axial surfaces 93A, 93B confronting adjacent pole pieces 33. The magnetic pole piece 33 end surfaces 33A, 33B each confronting a respective face 93A or 93B of an adjacent component of magnetic flux 93.

In a still further alternative arrangement of a magnetic pole arrangement 300 is shown in FIG. 14b and in which said combined source 94 comprises a hexagonal cross-sectioned structure magnet 94. Said hexagonal cross-sectioned structure 94 may have oppositely facing axially, radially and circumferentially extending end surfaces 94A, 94B and oppositely facing radially and circumferentially extending blank ends 94C, 94D. The combined source of magnetic flux may further include a plurality of radially and axially extending circumferentially spaced supplemental magnets 51. Said magnets 51 each having first and second oppositely facing axial ends 51A, 51B and oppositely facing side surfaces 51C, 51D. The blank ends 94C, 94D of the source of magnetic flux 94 may confront respective first and second axial ends 51A, 51B of said supplemental magnets 51 whilst said side surfaces 33C, 33D of said pole pieces 33 may confront respective oppositely facing side surfaces 51C, 51D of said supplemental magnets 51. The magnets 93, 94 are only magnetised in circumferential direction but due to their orientation and the way they interface with magnetic pole pieces 33, vector of flux density entering magnetic pole pieces 33 has axial and circumferential component.

A circumferential gap between neighbouring magnetic pole pieces 33 is necessary to limit pole to pole leakage of magnetic flux. FIG. 14a shows this circumferential gap. It is possible to place circumferentially magnetised magnets 50 in the gap between neighbouring magnetic pole pieces 33, as shown in FIG. 14b. The additional circumferentially magnetised magnets 50 will limit pole to pole flux leakage and also provide additional flux, boosting magnetic performance of the rotor.

While plates 100 (as shown in FIG. 11) are not necessary from magnetic point of view, they can be included to improve mechanical robustness of the rotor. However, their thickness is not dictated by the need to guide magnetic flux.

The rotor unit 120 in any embodiment can have an array of radially magnetised magnets 60 (as shown in FIGS. 5 & 6) placed at the inner radius of the magnetic pole pieces 30. This would further improve the flux density in the air gap between rotor and stator.

Although, a radial field internal rotor is shown in some embodiments, the same concept of three-dimensional flux focusing can be used to construct a radial field external rotor using rotor unit 120 similar to that illustrated in FIG. 2e by changing the placement of radially magnetised magnets such that the radial flux is provided on a face at external radius of the pole piece 30.

Figure 15A:
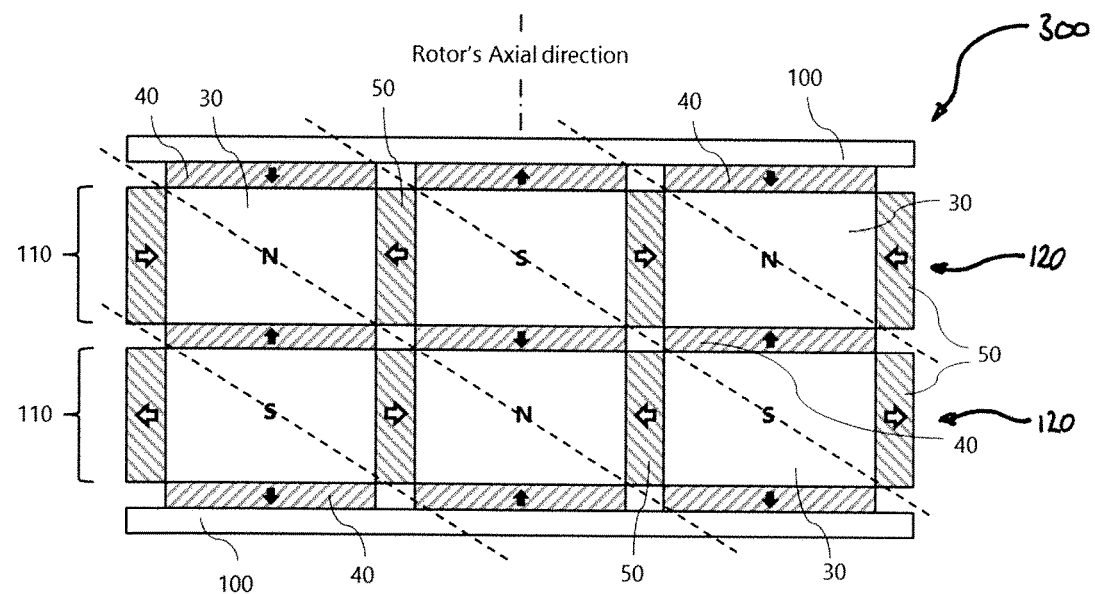
FIG. 15a is a partial external view of the radial field internal rotor when looked along the radial direction. It shows two rotor units with magnetic pole pieces and magnets arranged in manner to create a skew between the magnetic poles of the neighbouring rotor units.

In the further alternative embodiment shown in FIG. 15a comprising magnetic pole pieces 30, axially magnetised magnets 40 and circumferentially magnetised magnets 50 the axially adjacent magnetic pole pieces 30 in each magnetic pole assembly 110 belonging to two different rotor units 120 may be connected by only one axially magnetized magnet 40. Therefore, axially adjacent pole pieces 30 may be arranged in alternating south and north polarities. This creates a rotor 130 with stepped skew. Such step skewing of rotors 130 is a well-known method of reducing torque ripple in electrical machines.

Figure 15B:
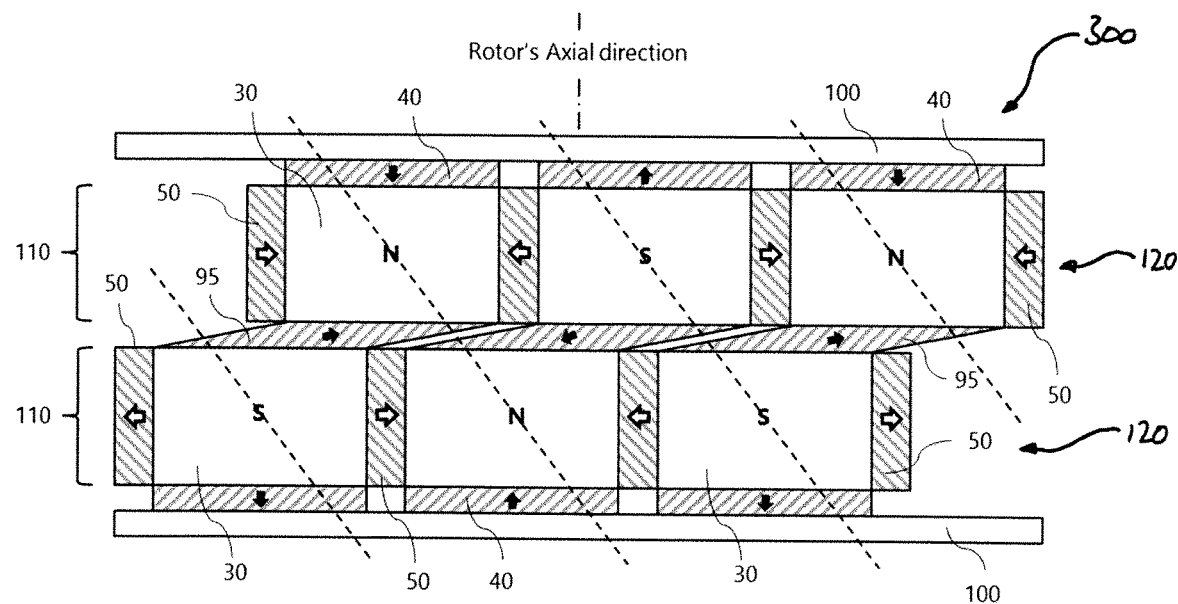
FIG. 15b is a partial external view of the radial field internal rotor when looked along the radial direction. It shows two rotor units with magnetic pole pieces, block shaped magnets and parallelogram cross-section magnets magnetised such that there is a skew between the magnetic poles of the neighbouring rotor units.

The embodiment in FIG. 15b shows that parallelogram cross-section magnets 95 can be used to connect rotor units 120, providing axially adjacent pole pieces 30 in each magnetic pole assembly 110 that are circumferentially skewed or offset relative to each other. Thus, allowing for shift of rotor units 120 in circumferential direction with respect to each other, thus reducing skew angle. In extreme case, the shift angle can be such that north and south poles in all rotor units 120 are perfectly aligned with skew angle ~0. Depending on desired performance, this skew angle can be varied.

Figure 15C:
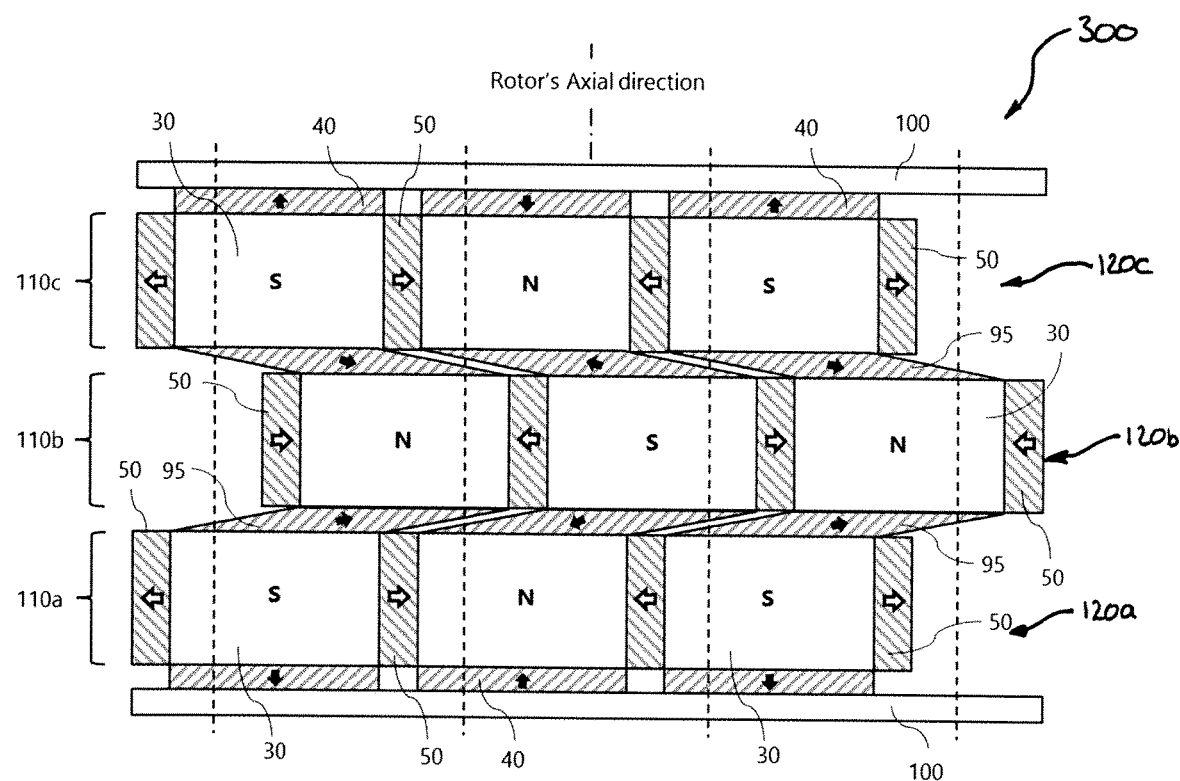
FIG. 15c is a partial external view of the radial field internal rotor when looked along the radial direction. It shows three rotor units with magnetic pole pieces, block shaped magnets and parallelogram cross-section magnets magnetised such that there is a skew between the magnetic poles of the neighbouring rotor units.

The concept of skewing is further extended in the embodiment shown in FIG. 15c with three rotor units 120. Between the rotor units 120, the magnets 95 have a parallelogram cross-section in the radial view. The array of parallelogram cross-section magnets 95 between first and second rotor units 120a and 120b has different orientation and magnetisation direction compared to the array of parallelogram cross-section magnets 95 between second and third rotor units 120b and 120c. Such arrangement again changes the skew angle between the rotor units. Having only one array of magnets 95 between rotor units 120 reduces axial length of the rotor 130 and improves active to passive axial length ratio.

Plates 100 made of magnetic material are only needed to provide return path for flux generated by axially magnetised magnets 40 at axial ends of the rotor 130. Plates can also be included between the rotor units 120 to improve mechanical robustness of the rotor.

Figure 8A:
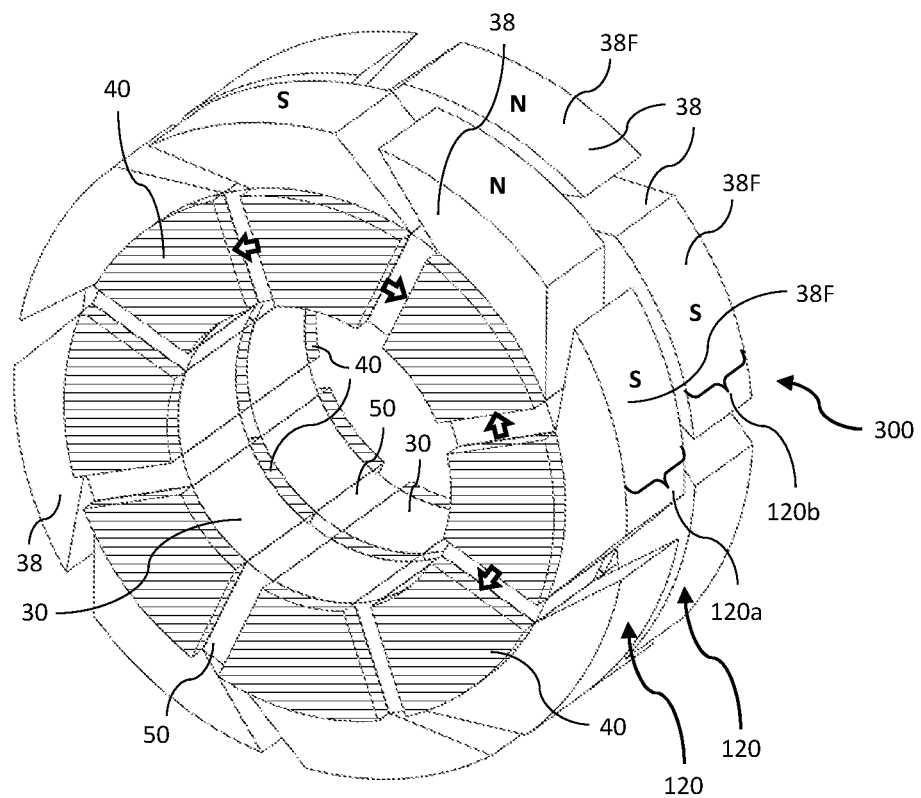
FIG. 8a shows a radial field internal rotor unit with two rotor units. For each of the rotor units, magnetic pole pieces, axially magnetised magnets and circumferentially magnetised magnets are shown. The rotor unit comprising multiple magnetic pole assemblies wherein each magnetic pole piece includes a pole shoe extending from the radial surface. The pole shoe offsets the radial surface radially and circumferentially and the direction of this circumferential offset is different for the neighbouring rotor units.
Figure 8B:
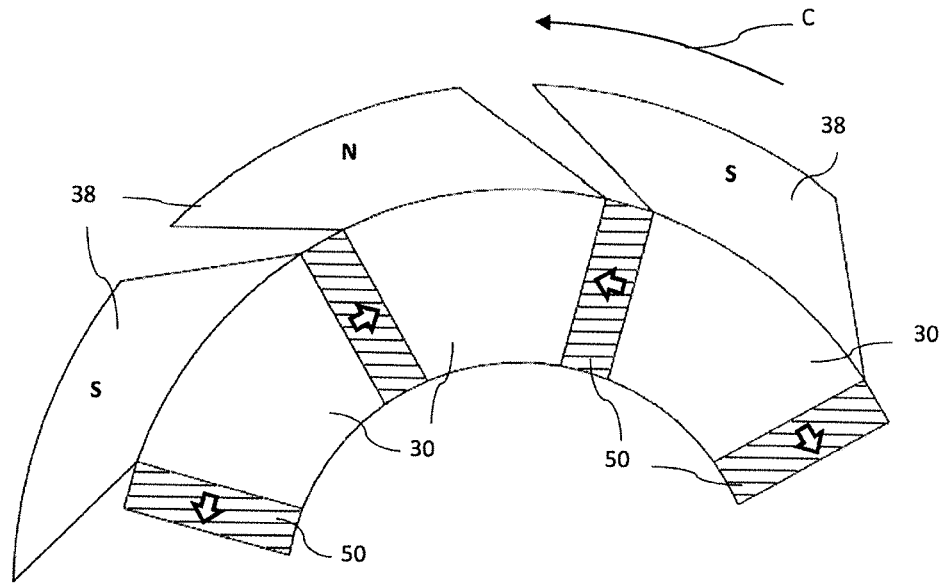
FIG. 8b shows a section view of the radial field internal rotor unit of FIG. 8a in which each pole shoe provides a circumferential offset of the external face of each pole piece in direction C.
Figure 8C:
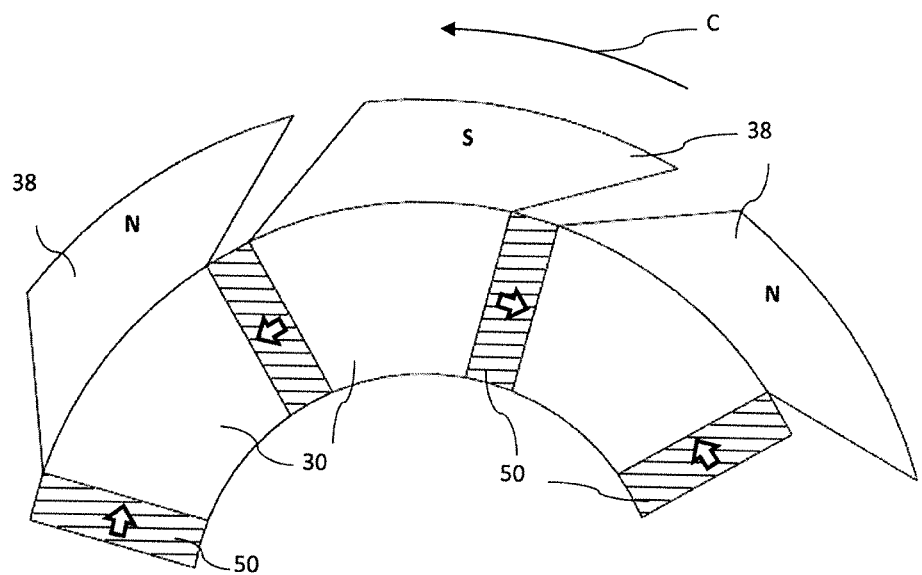
FIG. 8c shows a section view of the radial field internal rotor unit of FIG. 8a in which each pole shoe provides a circumferential offset of the external face of each pole piece opposite to direction C.
Figure 11B:
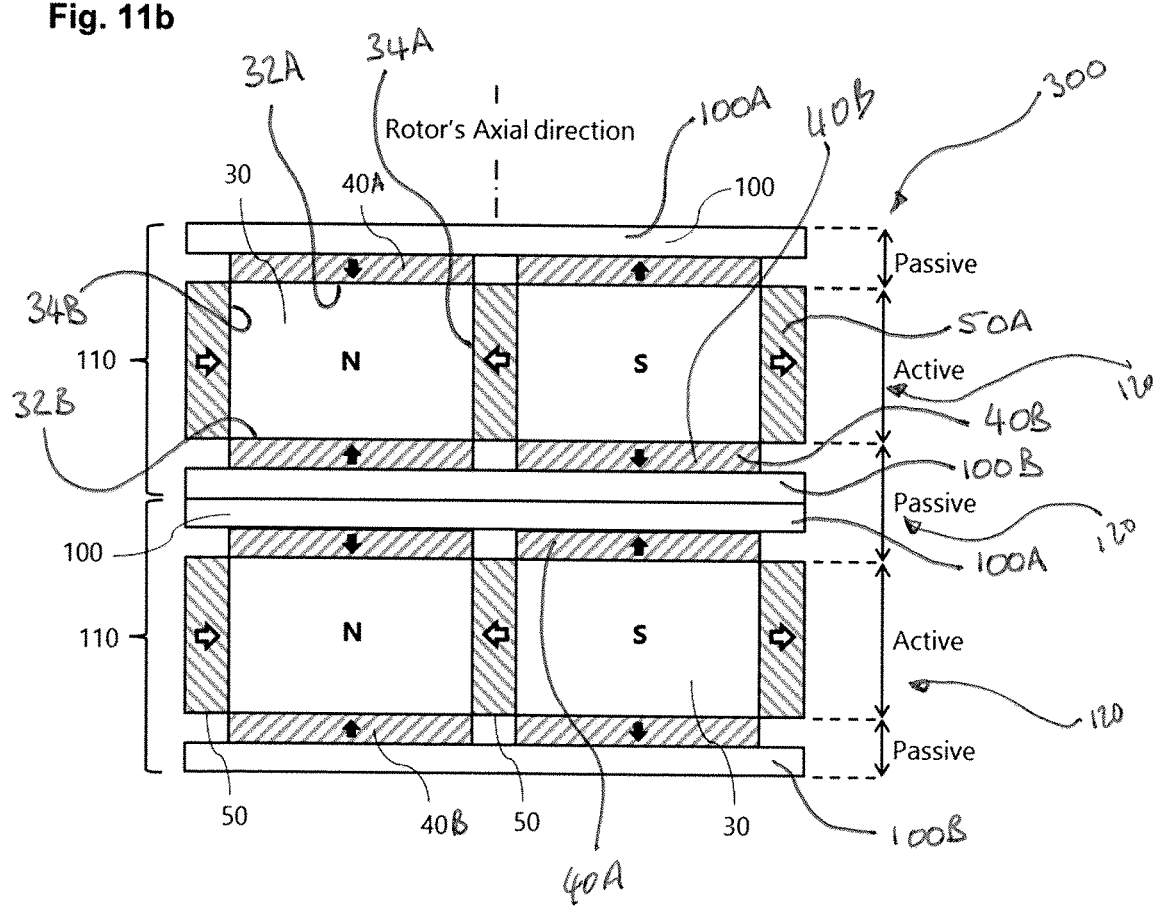
FIG. 11b is a partial external view of the radial field internal rotor when looked along the radial direction. It shows two rotor units with magnetic pole pieces, sources of magnetic flux and ferromagnetic plates.

Embodiment depicted in FIG. 8a comprises a first axial source of magnetic flux 40, a second source of circumferential magnetic flux 50 and each magnetic pole piece 30 includes a pole shoe 38. Since magnetic pole pieces 30 belonging to two neighbouring rotor units 120a and 120b are connected by only one array of axially magnetized magnets 40, alternate south and north poles are formed in axial direction. The pole shoes 38 in FIG. 8 are used to offset pole face 38F with respect to the magnetic pole piece 30 in both circumferential and radial directions so that north and south poles created by the rotor units 120a and 120b are aligned. Axial alignment of poles can be either perfect or can have skewed. The partial axial cross-sectional views are shown in FIG. 8b and FIG. 8c for rotor units 120a and 120b, respectively. In the axial direction, alternate poles are created. Since the pole shoes are offset in the circumferential direction, the poles of neighbouring rotor units are aligned at the outer radius of the rotor, as depicted in FIG. 11b.

It will be appreciated that this embodiment allows the advantages of reduced axial length of the rotor 130 and improved active to passive axial length ratio given by the rotor arrangement of FIG. 15 to be maximised, with the benefit of independently being able to vary the skew of the flux presented to air gap G by sequential rotor units 120.

Each rotor unit 120 in this embodiment can have an array of radially magnetised magnets 60 (as shown in FIG. 2b) placed at the inner radius (below the magnetic pole piece 30 shown in FIG. 8) of the magnetic pole piece 30. This would further improve the flux density in the air gap between rotor and stator.

FIG. 9a shows the radial field internal rotor unit 120 shown in FIG. 2c as part of an electrical machine. In addition to the radial field internal rotor unit 120 previously described the machine comprises a stator 200. Said stator 200 comprises a plurality of electro magnets 220. The plurality of electro magnets include a plurality of fingers 224 of the core 210 around which a plurality of coils 222 which can be supplied with electric current. The electromagnets 220 are disposed in a circumferential direction C around the axis of rotation X. FIG. 9b shows an axial section of the electric machine of FIG. 9a. The electric machine of FIG. 9a and FIG. 9b shows four electromagnets comprising four sets of coils but it will be appreciated that not all the electromagnets 220 of the particular embodiment of the electrical machine are shown in said figures. In further embodiments it is possible for the stator 200 to comprise any plurality of electromagnets 220.

FIG. 10a shows the radial field internal rotor unit 120 shown in FIG. 2e with the addition of a cut away view of the axially extending tubular structure 101, as part of an electrical machine. In addition to the radial field external rotor unit 120 previously described the machine comprises a stator 200. Said stator 200 comprises a plurality of electro magnets 220. The plurality of electro magnets comprise a plurality of fingers 224 of the core 210 around which a plurality of coils 222 which can be supplied with electric current. The electromagnets 220 are disposed in a circumferential direction C around the axis of rotation X. FIG. 10b shows an axial section of the electric machine of FIG. 10a. The electric machine of FIG. 10a and FIG. 10b shows four electromagnets comprising four sets of coils, it will be appreciated that not all the electromagnets 220 of the particular embodiment of the electrical machine are shown in said figures. In further embodiments it is possible for the stator 200 to comprise any plurality of electromagnets 220.

The invention claimed is:

1. A magnetic pole arrangement having a longitudinally extending axis of rotation X comprising a plurality of magnetic pole assemblies arranged back-to-back along said longitudinally extending axis of rotation X and each providing flux to an air gap, wherein each magnetic pole assembly comprising magnetic pole pieces and two components of magnetic flux, wherein:
   each magnetic pole piece includes a first axial face, a second axial face, a first circumferential face, a second circumferential face, a radially inner surface and a radially outer surface wherein:
   said first component of magnetic flux comprises a plurality of axially magnetised circumferentially spaced central magnets and a plurality of circumferentially magnetised circumferentially spaced side magnets, wherein said central magnets and respective side magnets are arranged in a Halbach array, and wherein the axially magnetised circumferentially spaced central magnets and the circumferentially magnetised circumferentially spaced side magnets are adjacent; and
   said second component of magnetic flux comprise a plurality of circumferentially magnetized magnets each having a north side N and a south side S and being circumferentially spaced around said axis X relative to each other and respectively lying adjacent respective first circumferential faces and respective second circumferential faces of each magnetic pole piece.

2. A magnetic pole arrangement as claimed in claim 1 and wherein each magnetic pole assembly includes a first and a second circumferentially and radially extending magnetic plates, said first plate contacting and extending between respective axially magnetized circumferentially spaced central magnets and first circumferentially magnetized circumferentially spaced side magnets and said second plate contacting and extending between respective second axially magnetized circumferentially spaced central magnets and second circumferentially magnetized circumferentially spaced side magnets.

3. A magnetic pole arrangement as claimed in claim 2 and wherein said first plate of a first pole assembly also forms the second plate of a next adjacent pole assembly.

4. A magnetic pole arrangement as claimed in claim 1 and further including:
- a plurality of third components of magnetic flux each comprising a radially magnetized magnet having a north side N and a south side S and each being provided adjacent said respective radially inner surfaces or said respective radially outer surfaces of the magnetic pole pieces; and
- a ferromagnetic tube attached to said radially magnetized magnets.

5. A magnetic pole arrangement as claimed in claim 1 and wherein circumferentially adjacent pole pieces in each magnetic pole assembly are arranged in alternating North and South magnetic polarity, and wherein axially adjacent pole pieces in each magnetic pole assembly are arranged in alternating North and South magnetic polarity.

6. A magnetic pole arrangement as claimed in claim 1 and wherein axially adjacent pole pieces in each magnetic pole assembly are circumferentially skewed or offset relative to each other.

7. A magnetic pole arrangement as claimed in claim 1 and including a combined source of said first and second components of magnetic flux comprising a triangular cross-sectioned structure having an axially, radially and circumferentially extending first surface confronting an adjacent pole piece and wherein the pole piece has a circumferential width W which varies along axial direction A.

8. A magnetic pole arrangement as claimed in claim 1 and including a combined source of said first and second components of magnetic flux comprising a quadrilateral cross-sectioned magnet 1 having first and second oppositely facing axial surfaces confronting adjacent pole pieces and having circumferential width W which varies along axial direction A and a plurality of pole piece each having a hexagonal cross-sectioned structure having oppositely facing axially, radially and circumferentially extending end surfaces each confronting a respective face of an adjacent component of magnetic flux.

9. A magnetic pole arrangement as claimed in claim 1 and wherein said magnetic pole pieces comprise a hexagonal cross-sectioned structure having first and second oppositely facing axially displaced end surfaces and first and second oppositely facing circumferentially displaced side surfaces and said combined source of said first and second components of magnetic flux comprises a hexagonal cross-sectioned structure having oppositely facing axially, radially and circumferentially extending end surfaces and oppositely facing radially and circumferentially extending blank ends and further include a plurality of radially and axially extending circumferentially spaced supplemental magnets each having first and second oppositely facing axial ends and oppositely facing side surfaces,
- wherein said blank ends of the source of magnetic flux confront respective first and second axial ends of said supplemental magnets,
- and wherein said side surfaces of said pole pieces confront respective oppositely facing side surfaces of said supplemental magnets.

10. A magnetic pole arrangement as claimed in claim 1 and wherein each pole piece includes a pole shoe extending away from a radial surface not having a radial source of magnetic flux adjacent thereto and wherein said pole shoe includes a pole face which is both radially and circumferentially offset relative to the pole piece.

11. A magnetic pole arrangement having a longitudinally extending axis of rotation X comprising a plurality of magnetic pole assemblies arranged back-to-back along said longitudinally extending axis of rotation X and each providing flux to an air gap, wherein each magnetic pole assembly comprising magnetic pole pieces and two components of magnetic flux, wherein:
- each magnetic pole piece includes a first axial face, a second axial face, a first circumferential face, a second circumferential face, a radially inner surface and a radially outer surface, wherein:
- said first component of magnetic flux comprise a plurality of first and second axially displaced axially magnetised magnets having a north side N and a south side S and arranged in respective circumferentially extending arrays adjacent respective first and second axial faces of said magnetic pole pieces; and
- said second component of magnetic flux comprise a plurality of circumferentially magnetised magnets each having a north side N and a south side S and being circumferentially spaced around said axis X relative to each other and respectively lying adjacent respective first circumferential faces and respective second circumferential faces of each magnetic pole piece, wherein said axially and radially extending circumferentially magnetised second component of magnetic flux extend axially past inner faces of said plurality of first and second axially displaced axially magnetised magnets.

12. A magnetic pole arrangement as claimed in claim 11 and wherein each magnetic pole assembly includes a first and a second circumferentially and radially extending magnetic plates, said first plate contacting and extending between respective first circumferentially extending axially magnetised magnets and the axially and radially extended circumferentially magnetised magnets and said second plate contacting and extending between respective second circumferentially extending axially magnetised magnets and the axially and radially extended circumferentially magnetised magnets.

13. A magnetic pole arrangement as claimed in claim 11 and wherein said first plate of a first pole assembly also forms the second plate of a next adjacent pole assembly.

14. A magnetic pole arrangement as claimed in claim 11 and further including a plurality of third components of magnetic flux each comprising a radially magnetised magnet having a north side N and a south side S and each being provided adjacent said respective radially inner surfaces or said respective radially outer surfaces of the magnetic pole pieces, and further including a ferromagnetic tube attached to said radially magnetised magnets.

15. A magnetic pole arrangement as claimed in claim 11 and wherein circumferentially adjacent pole pieces in each magnetic pole assembly are arranged in alternating North and South magnetic polarity, and wherein axially adjacent pole pieces in each magnetic pole assembly are arranged in alternating North and South magnetic polarity.

16. A magnetic pole arrangement as claimed in 11 and wherein axially adjacent pole pieces in each magnetic pole assembly are circumferentially skewed or offset relative to each other.

17. A magnetic pole arrangement as claimed in claim 11 and wherein each pole piece includes a pole shoe extending away from a radial surface not having a radial source of magnetic flux adjacent thereto and wherein said pole shoe includes a pole face which is both radially and circumferentially offset relative to the pole piece.

18. A magnetic pole arrangement as claimed in claim 11 and including a combined source of said first and second components of magnetic flux comprising a quadrilateral cross-sectioned magnet having first and second oppositely facing axial surfaces confronting adjacent pole pieces and having circumferential width W which varies along axial direction A and a plurality of pole piece each having a hexagonal cross-sectioned structure having oppositely facing axially, radially and circumferentially extending end surfaces each confronting a respective face of an adjacent component of magnetic flux.

19. A magnetic pole arrangement as claimed in claim 11 and wherein said magnetic pole pieces comprise a hexagonal cross-sectioned structure having first and second oppositely facing axially displaced end surfaces and first and second oppositely facing circumferentially displaced side surfaces and said combined source of said first and second components of magnetic flux comprises a hexagonal cross-sectioned structure having oppositely facing axially, radially and circumferentially extending end surfaces and oppositely facing radially and circumferentially extending blank ends and further include a plurality of radially and axially extending circumferentially spaced supplemental magnets each having first and second oppositely facing axial ends and oppositely facing side surfaces, wherein said blank ends of the source of magnetic flux confront respective first and second axial ends of said supplemental magnets, and wherein said side surfaces of said pole pieces confront respective oppositely facing side surfaces of said supplemental magnets.

20. A magnetic pole arrangement having a longitudinally extending axis of rotation X comprising a plurality of magnetic pole assemblies arranged back-to-back along said longitudinally extending axis of rotation X and each providing flux to an air gap, wherein each magnetic pole assembly comprising magnetic pole pieces and two components of magnetic flux, wherein:

the two components of magnetic flux are provided by a combined source, the combined source comprising a triangular cross-sectioned structure having an axially, radially and circumferentially extending first surface confronting an adjacent pole piece, the adjacent pole piece being a magnetic pole piece, and wherein the adjacent pole piece has a circumferential width W which varies along axial direction A.

* * * * *